US006628303B1

(12) United States Patent
Foreman et al.

(10) Patent No.: US 6,628,303 B1
(45) Date of Patent: *Sep. 30, 2003

(54) GRAPHICAL USER INTERFACE FOR A MOTION VIDEO PLANNING AND EDITING SYSTEM FOR A COMPUTER

(75) Inventors: Kevin J. Foreman, North Andover, MA (US); Darrell N. LeBlanc, Methuen, MA (US); Brett D. Granger, Arlington, MA (US); Iván M. Cavero-Belaunde, Cambridge, MA (US)

(73) Assignee: Avid Technology, Inc., Tewksbury, MA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/687,926

(22) Filed: Jul. 29, 1996

(51) Int. Cl.[7] .................................................. G09G 5/00

(52) U.S. Cl. ........................ 345/723; 345/724; 345/725; 345/726

(58) Field of Search ................................. 345/326, 327, 345/328, 762, 806, 807, 302, 329, 330, 716, 717, 719, 720, 721, 723, 724, 725, 726

(56) References Cited

U.S. PATENT DOCUMENTS

| 4,538,188 A | 8/1985 | Barker et al. ............... 360/14.3 |
| 4,685,003 A | 8/1987 | Westland .................... 360/14.1 |
| 4,746,994 A | 5/1988 | Ettlinger ........................ 360/13 |
| 5,012,334 A | 4/1991 | Etra ............................ 348/107 |
| 5,097,351 A | 3/1992 | Kramer ........................ 395/17 |
| 5,196,933 A | 3/1993 | Henot .................... 375/240.15 |
| 5,214,528 A | 5/1993 | Akanabe et al. ............. 359/211 |
| 5,237,648 A | 8/1993 | Mills et al. .................. 345/433 |
| 5,267,351 A | 11/1993 | Reber et al. ................. 707/104 |
| 5,274,758 A | 12/1993 | Beitel et al. ................. 345/302 |
| 5,307,456 A | 4/1994 | MacKay ...................... 345/782 |
| 5,317,732 A | 5/1994 | Gerlach, Jr. et al. ..... 707/104.1 |
| 5,390,138 A | 2/1995 | Milne et al. ................. 381/119 |
| 5,404,316 A | 4/1995 | Klingler et al. ............. 345/328 |

(List continued on next page.)

FOREIGN PATENT DOCUMENTS

| EP | 0 403 118 | 12/1990 |
| EP | 0 469 850 | 2/1992 |
| EP | 0 526 064 | 2/1993 |

(List continued on next page.)

OTHER PUBLICATIONS

The Electronic Scrapbook: Towards an Itelligent Home–Video Editing System, by Amy Susan Bruckman, Sep. 1991.
Video Mosaic: Laying Out Time In A Physical Space.

(List continued on next page.)

*Primary Examiner*—Ba Huynh
(74) *Attorney, Agent, or Firm*—Peter J. Gordon

(57) ABSTRACT

A graphical user interface for a computer-assisted motion video editing system directs a user through the process of editing a video program. The graphical user interface may also enable a user to plan a video program. Alternatively selectable interfaces within a single window interface, each of which provide a group of planning, capturing, editing, and recording functions can provide such an interface for producing a video program. Other simplifications to the user interface can be provided to assist in editing, such as by maintaining a video display window for displaying the edited video program at a fixed position for all available editing operations. Additionally, video information can be captured directly into a timeline representation of a video program, rather than a bin. Using a storyboard tied to the capturing process, a user is directed through the process of collecting and capturing the video clips to be used in the video program.

27 Claims, 24 Drawing Sheets

U.S. PATENT DOCUMENTS

| | | | |
|---|---|---|---|
| 5,442,744 A | * 8/1995 | Piech et al. .................. | 345/807 |
| 5,488,433 A | 1/1996 | Washino et al. ............. | 348/722 |
| 5,489,947 A | 2/1996 | Cooper ........................ | 348/589 |
| 5,493,568 A | 2/1996 | Sampat et al. ............... | 370/261 |
| 5,513,306 A | 4/1996 | Mills et al. .................. | 707/530 |
| 5,515,490 A | 5/1996 | Buchanan et al. ........... | 707/500 |
| 5,534,942 A | 7/1996 | Beyers, Jr. et al. .......... | 348/569 |
| 5,537,157 A | 7/1996 | Washino et al. ............. | 348/722 |
| 5,539,869 A | 7/1996 | Spoto et al. .............. | 707/500.1 |
| 5,568,275 A | * 10/1996 | Norton et al. ................. | 386/52 |
| 5,584,006 A | 12/1996 | Reber et al. ................. | 395/427 |
| 5,592,602 A | 1/1997 | Edmunds et al. ............ | 345/474 |
| 5,613,057 A | 3/1997 | Caravel ........................ | 345/302 |
| 5,619,636 A | 4/1997 | Sweat et al. .............. | 707/500.1 |
| 5,623,308 A | 4/1997 | Civanlar et al. ............. | 348/392 |
| 5,652,714 A | 7/1997 | Peterson et al. ............... | 702/57 |
| 5,659,790 A | 8/1997 | Kim et al. ................ | 707/500.1 |
| 5,659,792 A | * 8/1997 | Walmsley .................... | 345/302 |
| 5,659,793 A | 8/1997 | Escobar et al. .............. | 395/807 |
| 5,664,216 A | 9/1997 | Blumenau .................... | 345/302 |
| 5,680,619 A | 10/1997 | Gudmundson et al. ...... | 717/108 |
| 5,682,326 A | 10/1997 | Klingler et al. .............. | 345/302 |
| 5,684,963 A | 11/1997 | Clement ..................... | 395/226 |
| 5,712,953 A | 1/1998 | Langs ......................... | 704/214 |
| D391,558 S | 3/1998 | Marshall, Jr. et al. ...... | D14/486 |
| D392,264 S | 3/1998 | Marshall, Jr. et al. ...... | D14/486 |
| D392,267 S | 3/1998 | Mason et al. .............. | D14/491 |
| D392,268 S | 3/1998 | Mason et al. .............. | D14/491 |
| D392,269 S | 3/1998 | Mason et al. .............. | D14/491 |
| 5,724,605 A | 3/1998 | Wissner .................... | 707/500.1 |
| 5,752,029 A | 5/1998 | Wissner .................... | 707/104.1 |
| 5,754,851 A | 5/1998 | Wissner .................... | 707/104.1 |
| D395,291 S | 6/1998 | Mason et al. ............... | D14/490 |
| 5,760,767 A | * 6/1998 | Shore et al. ................. | 345/328 |
| 5,781,435 A | 7/1998 | Holroyd et al. ............... | 700/87 |
| 5,801,685 A | 9/1998 | Miller et al. ................. | 345/302 |
| 5,892,507 A | 4/1999 | Moorby et al. .............. | 345/302 |

OTHER PUBLICATIONS

| | | |
|---|---|---|
| EP | 0 564 247 | 10/1993 |
| EP | 0 592 250 | 4/1994 |
| EP | 0 613 145 | 8/1994 |
| EP | 0 689 133 | 12/1995 |
| EP | 0 706 124 | 4/1996 |
| WO | WO 88/07719 | 6/1988 |
| WO | WO 93/21636 | 10/1993 |
| WO | WO 94/03897 | 2/1994 |
| WO | WO 94/29868 | 12/1994 |

OTHER PUBLICATIONS

Wendy E. Mackay, Daniele S. Pagani, Rank Xeros Research Center, Proceedings Of Multimedia '94, San Francisco, CA ACM.

The Brughetti Corporation, Product Information for SLICE Transition Maker, PURE Image Creator, and AIR Playout Manager, 1994 (14 pages).

J.N. Agnew, et al. "The Right Tool for the Job: A Quest for the Perfect Authoring Package", Proceedings of SIGDOC '92: 10th Annual ACM Conference on Systems Documentation, Oct, 1992, Ottawa, Ontario, Canada, pp. 253–258.

H. Hardman, "New Authoring Tools for Windows", BYTE, vol. 18, No. 9, Aug. 1993, pp. 153–156.

J.F. Koegel, et al. "Improving Visual Programming Languages for Multimedia", Educational Multimedia and Hypermedia Annula, 1993, Proceedings of Ed–Media 93–World on Educational Multimedia and Hypermedia, Jun., 1993, Orlando, FL. pp. 286–293.

R. Gruenette, "Authorware and IconAuthor", CD–ROM Professional, vol. 8, No. 10, Oct. 1995, pp. 81–98.

Gebhard C: "Der Widerspenstigen Zahmung: Computer & Video" Radio Fernsehen Elektronik, vol. 44, No. 1, Jan. 1, 1995, Berlin DE.

"Schneller Zugriff: Video Machine Von Fast" Radio Fernshen Elektronik, vol. 44, No. 11, Nov. 1, 1995, Berlin, DE.

* cited by examiner

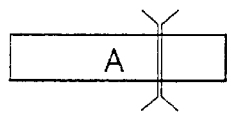
FIG. 17A
FIG. 17B
FIG. 17C
11 frames
FIG. 17D
FIG. 17E BEFORE: 11 frames [A] [B]
AFTER: 11 frames [ A ] [ B ]

*FIG. 24H*

BEFORE: [ A ] 11 frames [ B ]
AFTER: [A] 11 frames [ B ]

*FIG. 24I*

BEFORE: [A] 11 frames [ B ]
AFTER: [ A ] 11 frames [ B ]

*FIG. 24K*

BEFORE: [ A ] 11 frames [ B ]
AFTER: [A] 11 frames [ B ]

*FIG. 24L*

BEFORE: [A] 11 frames [ B ]
AFTER: [ A ] 11 frames [ B ]

*FIG. 24M*

GRAPHICAL USER INTERFACE FOR A MOTION VIDEO PLANNING AND EDITING SYSTEM FOR A COMPUTER

FIELD OF THE INVENTION

The present invention is related generally to systems for planning and editing motion video information. More particularly, the present invention is related to computer-assisted motion video editing systems, wherein motion video information is stored as a sequence of digital still images in a data file on a computer system.

BACKGROUND OF THE INVENTION

Computer systems with motion video editing tools have been used to produce major motion picture films, television shows, news broadcasts and in corporate settings to edit motion video. Unlike word processing tools, however, such motion video editing tools are not yet common for home use, primarily due to the cost of motion video editing tools, including hardware and software, and the complexity of the architecture and graphical user interface.

The high cost of motion video editing tools for computers is due, in part, to specialized hardware used to capture, digitize, compress, decompress and display motion video information on a computer screen with sufficient detail and resolution. The complexity of the graphical user interface of these motion video editing tools is due, in part, to the variety of possible operations which can be performed on motion video and also to a design for professionals familiar with motion video editing, and terms and concepts of that trade, with which the average person is unfamiliar. For example, many systems use a representation of a motion video composition as two tracks, A and B, between which "rolling" occurs. The concept of A/B rolling is unduly complex and has been simplified in other systems by using a "timeline," such as in the AVID/1 Media Composer from Avid Technology, Inc., of Tewksbury, Mass. Another complexity is the use, of multiple windows for controlling the various parameters of the motion video, displaying the motion video itself, sound track controls, and other features.

Another drawback of many motion video editing tools for computers is that most people have not been taught how to communicate ideas using motion video or how to efficiently produce a motion video program. Schools commonly teach written and oral expression and expression through still graphics but not motion video. While most motion video editing tools for computers are suitable for creating motion video programs, few tools assist in the creative design, planning and production of motion video programs.

Accordingly, a general aim of this invention is to provide a motion video editing system for a computer with reduced cost and complexity. Another aim of this invention is to provide a motion video editing system for a computer with tools for assisting creative design and planning of a motion video composition.

SUMMARY OF THE INVENTION

The present invention provides a simplified interface which directs a user through the process of editing a video program. In one aspect of the invention, the interface also enables a user to plan a video program. Alternatively selectable interfaces, each of which provide a group of planning, capturing, editing, and recording functions provide an intuitive interface for producing a video program. Other simplifications to the user interface can be provided to assist in editing, such as by maintaining the video display window at a fixed position. Additionally, video information can be captured directly into a timeline representation of a video program, rather than a bin. Using a storyboard tied to the capturing process, a user is directed through the process of collecting and capturing the video clips to be used in the video program.

Accordingly, one aspect of the invention is a graphical user interface for a computer motion video editing system, which has a single window interface including a plurality of alternatively selectable interfaces. A first of the plurality of selectable interfaces is an interface for making capturing commands available to a user for receiving motion video information to be edited. A second of the plurality of selectable interfaces is an interface for making editing commands available to a user for editing the received motion video information. A third of the plurality of selectable interfaces is an interface for making playback commands available to a user for outputting the edited motion video information to an external device. In one embodiment, a fourth of the plurality of selectable interfaces includes an interface for making storyboarding commands available to a user for preparing a plan describing a motion video program to be edited.

In another embodiment, the second of the plurality of selectable interfaces further includes a second plurality of alternatively selectable interfaces, wherein each selectable interface provides a set of editing functions of a particular type, and wherein each selectable interface has a video region for previewing the motion video program being edited and wherein the video region in each of the selectable interfaces is at an identical position within the single window interface.

Another aspect of the invention is a graphical user interface for editing computer motion video having a single window interface having a plurality of alternatively selectable interfaces. Each selectable interface provides a set of motion video editing functions of a different type. Each selectable interface also has a video region for previewing the motion video to be edited such that the video region in each selectable interface is at the same position within the single window interface.

Another aspect of the invention is a graphical user interface for a computer for assisting editing of a motion video program, having a planner module with inputs for receiving commands from a user descriptive of a plan of shots of video in the video program and providing an output representative of the plan. A capture module has a first input for receiving the plan defined by the user, a second input for receiving an input from a user for controlling recording of motion video information, and a third input for receiving a selection of a shot in the received plan. The capture module has an output in which captured motion video information is associated directly with the selected shot to provide the motion video program as a sequence of the recorded clips in an order defined by the plan.

Another aspect of the invention is computer video capture system which represents a sequence of video clips in a video program. Clips of a video program are captured directly into the represented sequence.

Another aspect of the invention is a set of a plurality of predefined plans stored in a computer memory. One aspect of this invention includes a mechanism for selecting one of the plans, for editing a selected plan, and for capturing video and for automatically generating a video sequence according to the selected plan.

Another aspect of the invention is a process for capturing motion video information and for generating a video program of a plurality of clips of captured motion video information. The process involves selecting a clip of the video program, capturing video information and associating the captured video information with the selected clip of the video program. In one embodiment, the step of selecting includes the step of selecting a shot from a plan representing and associated with the video program. In this embodiment, the step of associating includes the step of associating the captured video information with the clip of the video program associated with the selected shot from the plan.

In another embodiment, the process further involves performing the step of indicating whether a clip of the video program has captured motion video information associated thereto.

These and other aspects, goals, advantages and features of the invention will be apparent from a reading of the following detailed description.

BRIEF DESCRIPTION OF THE DRAWING

In the drawing,

FIGS. 17a–17e are a representation of timeline behavior produced in response to a user operation;

FIGS. 23a–23c are a representation of timeline behavior produced in response to a user operation; and FIGS. 24A–24I and 24K–24M are a representation of timeline behavior produced in response to a user operation.

DETAILED DESCRIPTION

Figure 1:
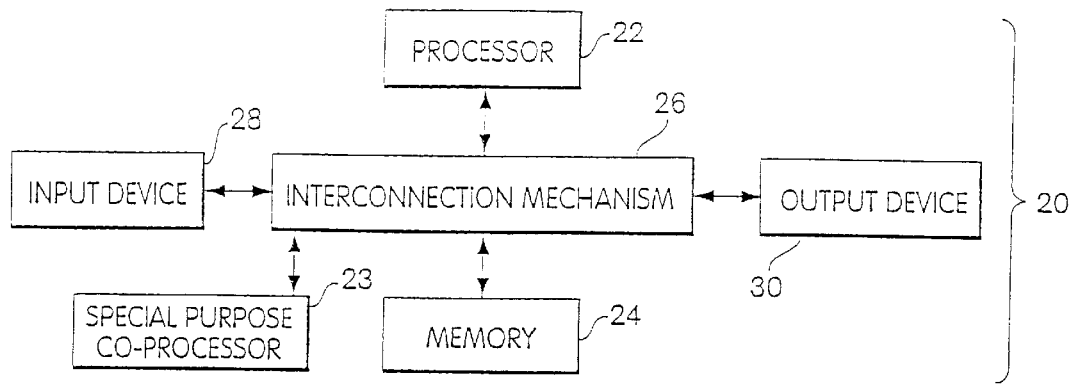
FIG. 1 is a block diagram of an example general purpose computer system in which the present invention may be implemented.

The present invention will be more completely understood through the following detailed description which should be read in conjunction with the attached drawing in which similar reference numbers indicate similar structures.

While many computer systems are available which enable a user to edit motion video, the selection of an appropriate interface for making commands available is a complex task due to the large number of possible operations which can be performed on video information. In the present invention, the graphical user interface directs a user through the steps of editing a motion video program, including planning (storyboarding), capturing the video information, editing the video information, and exporting the video information to a final data file or a video tape. In the process of editing, the user is directed through the steps of editing the primary content of the video program, adding effects at transitions between video clips, adding titles and credits, and finally, editing sound. By providing a simple interface which directs a user through these steps in which follows the steps typically used by professional video editors, the ability to edit quality video programs is available to the non-professional.

One embodiment of this invention will now be described in more detail. In this document, several terms are used to describe a video program and associated information. The following are definitions of these terms. A composition is a heterogeneous aggregation of tracks and, in one embodiment of the invention, includes five tracks: one title track, one video track, and three audio tracks. The composition is also referred to as a motion video program. One of the audio tracks is synchronized and grouped with the video track (the audio track that is captured with the video), one audio track is called a voice-over track, and the third audio track is a music track. Each track is a two part entity: a synchronized media subtrack and an effects subtrack. Each subtrack consists of a sequence of segments and holes. The media subtrack includes media segments, and the effects subtrack includes effects segments. A media segment is a portion of a media subtrack with a time-based beginning and ending. The interior of a media segment refers to a portion of a media clip. A media clip is an independent, playable entity which has duration and possibly multiple pieces of synchronized media associated with it. Media clips also have ancillary data associated with them, such as a name and description. Media is motion video media, audio media, or text media stored in a data file on a computer, for example, in a QuickTime file. A sync-lock group is a group of segments which have been grouped together for editing purposes. Editing operations will not move the components of a sync-lock group relative to each other. The video track and its corresponding audio track may be the only sync-lock group and cannot be unlocked or unsynched. A media segment is a video media segment, audio media segment, and text media segment, depending on which track the segment resides. A hole is a span in a track with a time-based beginning and ending which has no associated segment. On the video track, a hole displays black. On an audio track, a hole plays silence. On the titles track, a hole displays full transparency. Relative to a point or span in the composition, upstream composition elements are located earlier in the composition and downstream composition elements are located later in the composition. The beginning of a media segment is called its incoming edge, and the ending of a media segment is called its outgoing edge. The edges of media segments are also called transition points. A transition point has zero length. The edges of a group are transition points where a segment on one side of the transition is inside the group and any segment on the other side of the transition is outside of the group. A cut is a transition point that does not have an effect segment spanning it. At a transition point between two segments, the outgoing segment is the segment which displays before the transition point, and the incoming segment is the segment which displays after the transition point. Hence, the outgoing segment is to the left of a cut in the timeline; the incoming segment is to the right.

Figure 4:
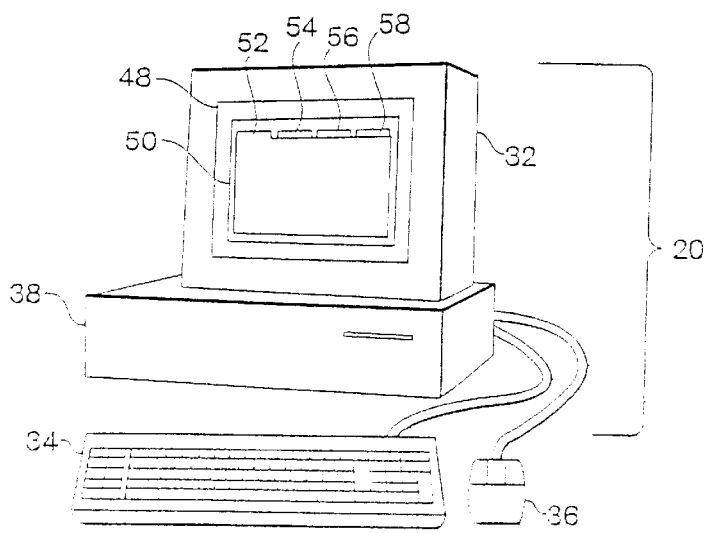
FIG. 4 is a perspective view of a computer system having a display showing one embodiment of the graphical user interface of the present invention.

The present invention may be implemented using a digital computer. A typical computer system 20 is shown in FIG. 1, and includes including a processor 22 connected to a memory system 24 via an interconnection mechanism 26. A special-purpose processor 23 may also be used for performing specific functions, such as encoding/decoding of data, or complex mathematical or graphic operations. An input device 28 is also connected to the processor and memory system via the interconnection mechanism, as is an output device 30. The interconnection is typically a combination of one or more buses and one or more switches. As shown in FIG. 4, the output device 30 may be a display 32 and the input device may be a keyboard 34 or mouse 36. The processor, interconnection mechanism and memory system typically are embodied in a main unit 38.

It should be understood that one or more output devices may be connected to the computer system. Example output devices include a cathode ray tube (CRT) display, liquid crystal display (LCD), printers, communication devices, such as a modem, and audio output. To enable recording of motion video information in an analog form, this computer system also may have a video output for providing a video signal to a VCR, camcorder or the like. It should also be understood that one or more input devices 28 may be connected to the computer system. Example input devices include a video capture circuit connected to a VCR or camcorder, keyboard, keypad, trackball, mouse, pen and tablet, communication device, audio input and scanner. The motion video capture circuit may be one of many commercially available boards. For example, a video capture card may connect to the PCI interface, and may use Motion-JPEG video compression and pixel averaging to compress images to 320×240-pixels at 30 frames per second. The video capture card may receive and may output composite video and S-video. It should be understood that the invention is not limited to the particular input or output devices used in combination with the computer system or to those described herein. The input and output devices may be included within or external to the main unit 38.

The computer system 20 may be a general purpose computer system, which is programmable using a high level computer programming language, such as "C++" or "Pascal". The computer system may also be implemented using specially programmed, special purpose hardware. In a general purpose computer system, the processor is typically a commercially available processor, such as the Power PC 603e RISC microprocessor. It may include a special purpose processor such as a CL540B Motion JPEG compression/decompression chip, from C-Cube of Milpitas, Calif. Many other processors are also available. Such a processor executes a program called an operating system, such as the Macintosh operating system, such as Macintosh System Software, version 7.5.3, which controls the execution of other computer programs and provides scheduling, debugging, input output control, accounting compilation, storage assignment, data management and memory management, and communication control and related services. The processor and operating system define a computer platform for which application programs in high level programming languages are written. It should be understood that the invention is not limited to a particular computer platform, particular operating system, particular processor, or particular high level programming language. Additionally, the computer system 20 may be a multi-processor computer system or may include multiple computers connected over a computer network. One embodiment of the present invention, is implemented using either a Macintosh Performa computer or Power Macintosh computer, with a PCI expansion slot and the Apple Video System, such as Performa 5400, 5420 or 6400 series computers from Apple Computer of Cupertino, Calif. Alternatively, an Apple Power Macintosh computer with a built-in compositor as video input and a PCI expansion slot, such as the 7600 or 8500 series computers with audio/video capabilities may be used. The computer system may also include an application for managing motion video files, such as the QuickTime 2.5 motion video system of Apple Computer.

Figure 2:
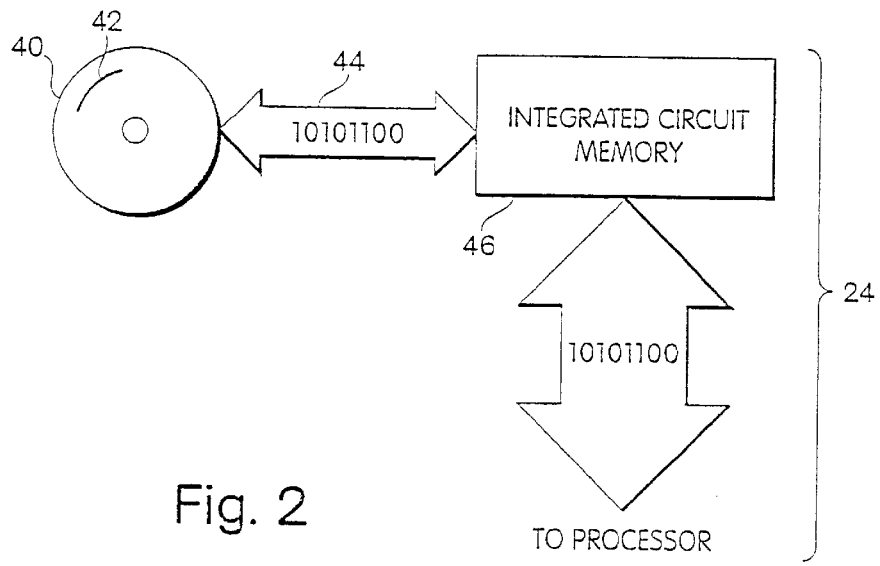
FIG. 2 is an example memory system shown in FIG. 1.

An example memory system 24 will now be described in more detail in connection with FIG. 2. A memory system typically includes a computer readable and writable non-volatile recording medium 40, of which a magnetic disk, a flash memory, and tape are examples. The disk may be removable, known as a floppy disk, and/or permanent, known as a hard drive. In particular, a PowerPC processor-based Macintosh Performa computer, having a gigabyte or more capacity hard disk drive and at least 16 to 24 megabytes of DRAM is preferred. The disk should have sufficient size to hold the video information to be edited, which is typically around 830 k bytes per second. The disk, which is shown in FIG. 2, has a number of tracks, as indicated at 42, in which signals are stored, in binary form, i.e., a form interpreted as a sequence of 1's and 0's, as shown at 44. Such signals may define an application program to be executed by the microprocessor, or information stored on the disk to be processed by the application program, such as video information stored in a data file. Typically, in operation, the processor 22 causes data to be read from the non-volatile recording medium 40 into an integrated circuit memory element 46, which is typically a volatile random access memory, such as a dynamic random access memory (DRAM) or static memory (SRAM). The integrated circuit memory element 46 allows for faster access to the information by the processor and disk 40, and is typically called the system memory. The system memory may be used as a buffer between the disk and output device 30 or the video information, as will be described in more detail below. The processor generally causes the data to be manipulated within the integrated circuit memory 46 and copies the data to the disk 40 if modified, when processing is completed. A variety of mechanisms are known for managing data movement between the disk 40 and the integrated circuit memory 46, and the invention is not limited thereto. It should also be understood that the invention is not limited to a particular memory system.

The different levels of software which interact in this system will now be described in more detail in connection with FIG. 3. Using a computer such as a Power Macintosh 7500 or 8500, using the System 7.5.2 operating system or higher, as indicated at 60, a video capture card is provided as indicated at 62. The QuickTime video system 64 interacts with the video capture card 62 via drivers 66. A video player system 67, such as the Apple Video Player, interacts with QuickTime 2.5. The software providing the editing instructions and graphical user interface to access these instructions is also designed to interact with QuickTime in parallel with the video player, as indicated at 68.

Figure 3:
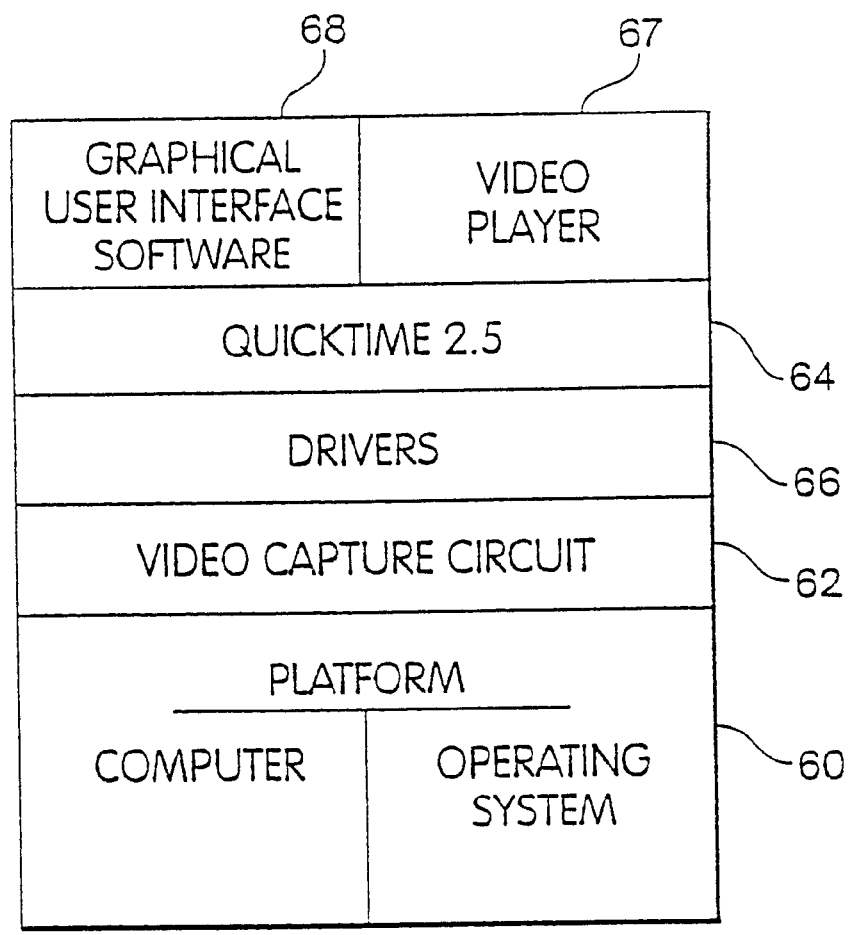
FIG. 3 is a diagram illustrating software layers in one embodiment of the present invention.

Such a platform as described in FIGS. 1–3 can be used to implement a graphical user interface in accordance with the invention. FIG. 4 shows, on an output device 32, a perspective view of a graphical user interface in one embodiment of the invention. Within the display area 48, a single window interface 50 is shown, having several selectable interfaces. In the embodiment shown in FIG. 4, the interfaces 52, 54, 56 and 58 are selectable by tabs. It should be understood that many other mechanisms are available, such as so-called "radio buttons" or "check boxes," which may be used to select a desired interface. In general, each interface is selectable in response to a cursor controlled input device, such as a mouse 36, but may also be keyboard operated.

Figure 5:
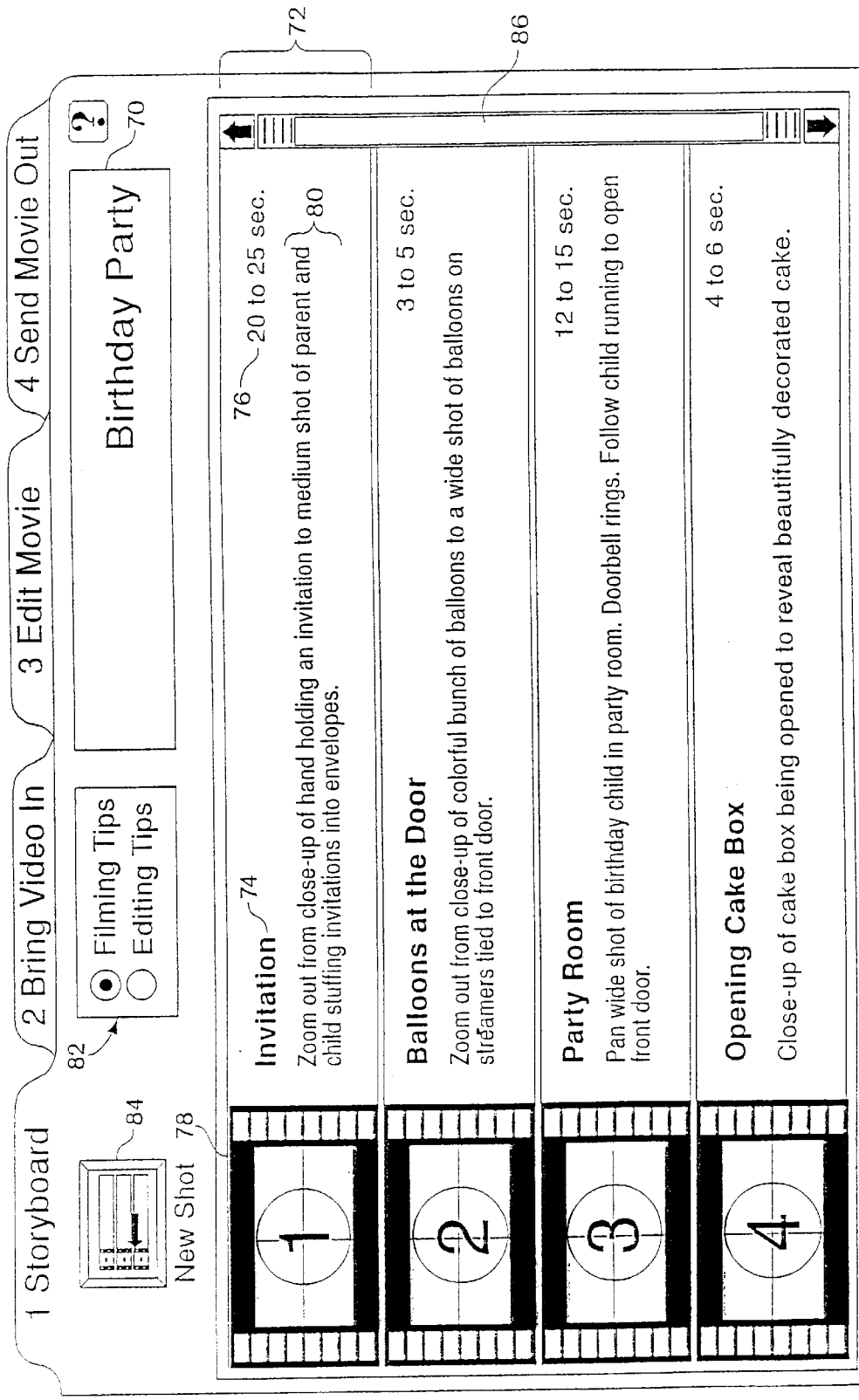
FIG. 5 is a graphic of a graphical user interface for providing planning functions in accordance with one embodiment of the present invention.
Figure 6:
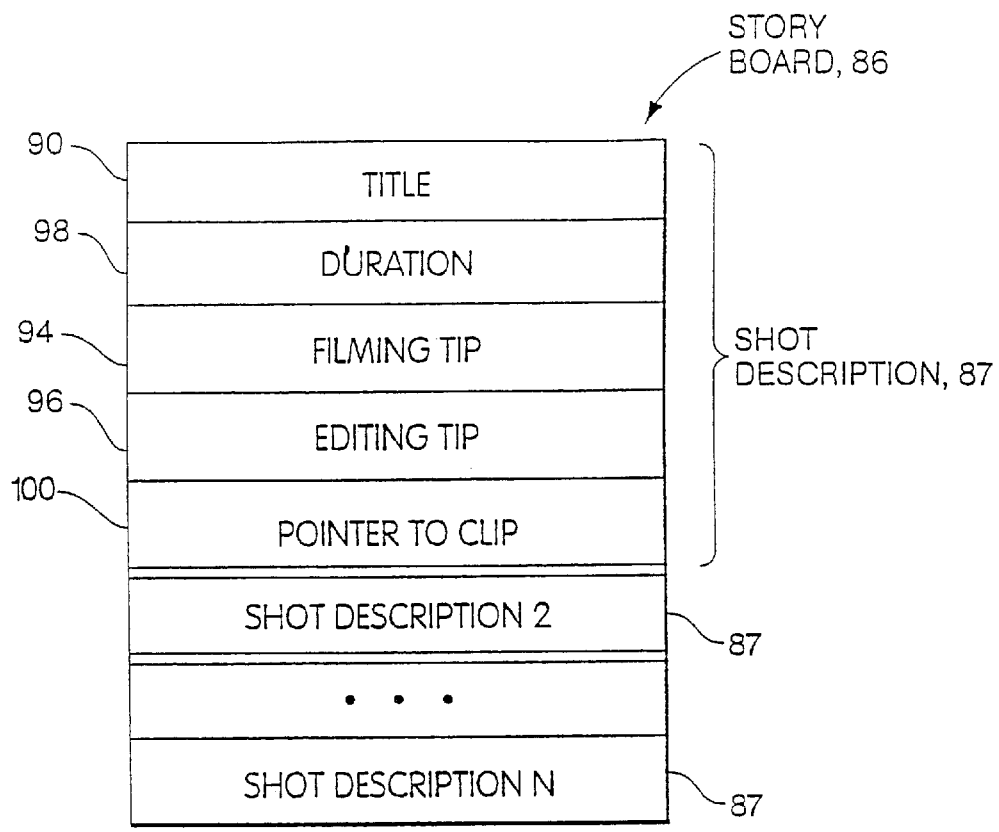
FIG. 6 is a diagram of a data structure for representing shots in accordance with one embodiment of the present invention.

The graphical user interface 50 and its functionality will now be described in more detail in connection with FIGS. 5–16. Referring now to FIG. 5, one of the selected interfaces is shown along with the graphic controls for selection of the other interfaces. The four interfaces in this embodiment include a storyboard interface 52, an interface 54 for bringing in motion video information, an interface 56 for editing a movie, an interface 58 for sending a movie out, for example, for recording to an external videotape device. Unless a previously stored composition is being opened for editing, the user is presented with either the storyboard interface or the bring video in interface when the editing system is first used.

The storyboard interface 52 enables a user to plan the motion video program to be prepared. In one aspect of the invention, storyboards or plans include filming tips and editing tips for common motion video programs, such as a birthday party, graduation or wedding. One aspect of the invention is that such storyboards and plans can be produced and distributed separately from the computer program and from actual motion video programs, by storing them on a computer-readable medium such as a floppy disk or CD-ROM or by making them accessible through a computer network. The storyboard interface 52 displays a written description of a composition or video program, including the title 70 of the composition and a linear sequence of description 72 of each shot. In one embodiment, these sequences represent the segments present in the video media track only of the composition. Holes are not represented in the storyboard. The displayed description of each shot includes the title 74 of the shot, a duration 76 (either actual or estimated), and a description 80 of either a filming tip or an editing tip. The duration may be a suggested duration or an actual duration of any media associated with the shot. Each shot is assigned a number, sequentially, which is displayed over a still image 78. The still image may be the first frame of an associated media clip or a default image used for all shots. Display of filming or editing tips is performed by selection of these options via an interface 82.

In the storyboard interface, a scroll bar 83 enables a user to scroll through the view of the storyboard for the selected video program. The "down" arrow key changes the current selection to the group containing the first shot which follows the last shot in the current selection. Likewise, the "up" arrow key changes the current selection to the group containing the last shot which precedes the first shot in the current selection. The "Home" key changes the current selection to the group containing the first shot in the storyboard. The "End" key changes the current selection to the group containing the last shot in the storyboard. "Page Up" and "Page Down" keys may be used to scroll through several shot descriptions at a time. When any storyboard navigation occurs due to keystrokes, the storyboard view scrolls to display the earliest selected shot. Typing a shot number selects a shot. Numbers typed in less time than a doubleclick time of a mouse are treated as multidigital numbers for navigation purposes.

The information used for each shot to enable the display of the storyboard interface 50 can be represented by an array or other ordered structure 86 of shot descriptions 87 (see FIG. 6) which stores, for each shot, the title 90, a film tip 94, an editing tip 96, a duration 98 and an indication 100 of a pointer to another structure representing a clip of media data captured in a video data file and associated with the shot. Operations which edit, delete, or add information about a shot for a given video program manipulate the data in this data structure 86. The displays shown in FIG. 5 are generated by creating display objects in response to data read from the data structure for a shot. These display objects are regenerated when necessary in response to changes to the data that they represent, as will be described in more detail below.

Figure 7:
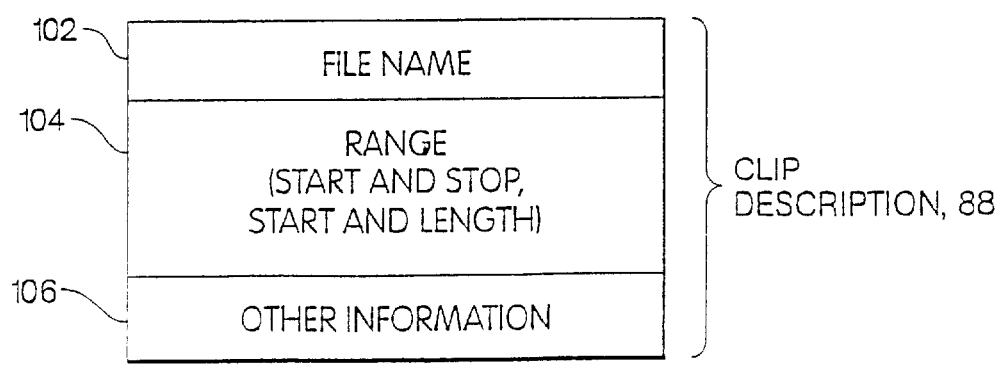
FIG. 7 is a diagram of a data structure for representing clips in accordance with one embodiment of the present invention.

A data structure 88 similar to data structure 86 may also be used to represent the motion video program itself, and includes clip descriptions 89 for each clip including a reference to a motion video data file to be used to produce the clip. Such a data structure 88 is shown in FIG. 7. It should be understood that the shot descriptions 87 in FIG. 5 and the clip descriptions 89 in FIG. 7 may be combined into one structure to represent the storyboard and motion video data of a motion video program. While the clip descriptions and shot descriptions may have redundant data, the redundant data clearly can be omitted and can be represented in only one of the structures or only once in a combined structure. The clip data structure 88 may be implemented as a QuickTime movie. Accordingly, a clip description will have an indication of a file name 102, indication of start and stop times 104 within the file, and other information 106 about the data file. A clip description may have empty fields, i.e., no video data file, yet but have a duration, to indicate a "hole" in a track in the program.

Referring again to FIG. 5, using standard techniques for implementation, any one of the displayed elements 74, 76 and 80 may be selected and edited by a user. Operations on a shot, such as insertion of a shot, deletion of a shot and moving of a shot are also possible. A storyboard can also be printed to allow a user to use the filming tips during filming, for example. Moving a shot may be performed by the user selecting and dragging a shot to a transition point in the display between shots. The computer detects the location of, for example, a mouse cursor, and determines a corresponding shot which the select shot should follow and rearranges the order of the shot descriptions in the data structure 86.

New shots may be added via a command button 84, through which a new shot description 72 is added with blank field 74, 76, 78 and 80, either immediately after a selected shot or at the end of a list of shots. The new shot exists only in the storyboard and is not added to the timeline of clips until the associated media data is captured. A default title, e.g., "Untitled", and duration, e.g., "0", and empty strings for filming and editing tips may be used for the new shot.

To delete a selected shot from the storyboard, the user selects the shot using the navigation steps noted above, and indicates a delete operation, for example, by using a <delete> key. Shots deleted from the storyboard are deleted from the timeline also, if there is a corresponding clip description, but the associated media is not deleted. Only the reference to the media in the clip description is deleted.

The operations performed on the clips in the timeline preferably are reflected automatically in the shot descriptions of the storyboard and vice versa. While this feature is easily implemented by representing the shot and clips using a single data structure, when clips and shots are represented separately, each operation on a clip or shot description should also make appropriate modifications to a corresponding shot or clip description, respectively. The process of controlling the clip and shot descriptions for this purpose will be described in more detail below.

Figure 8:
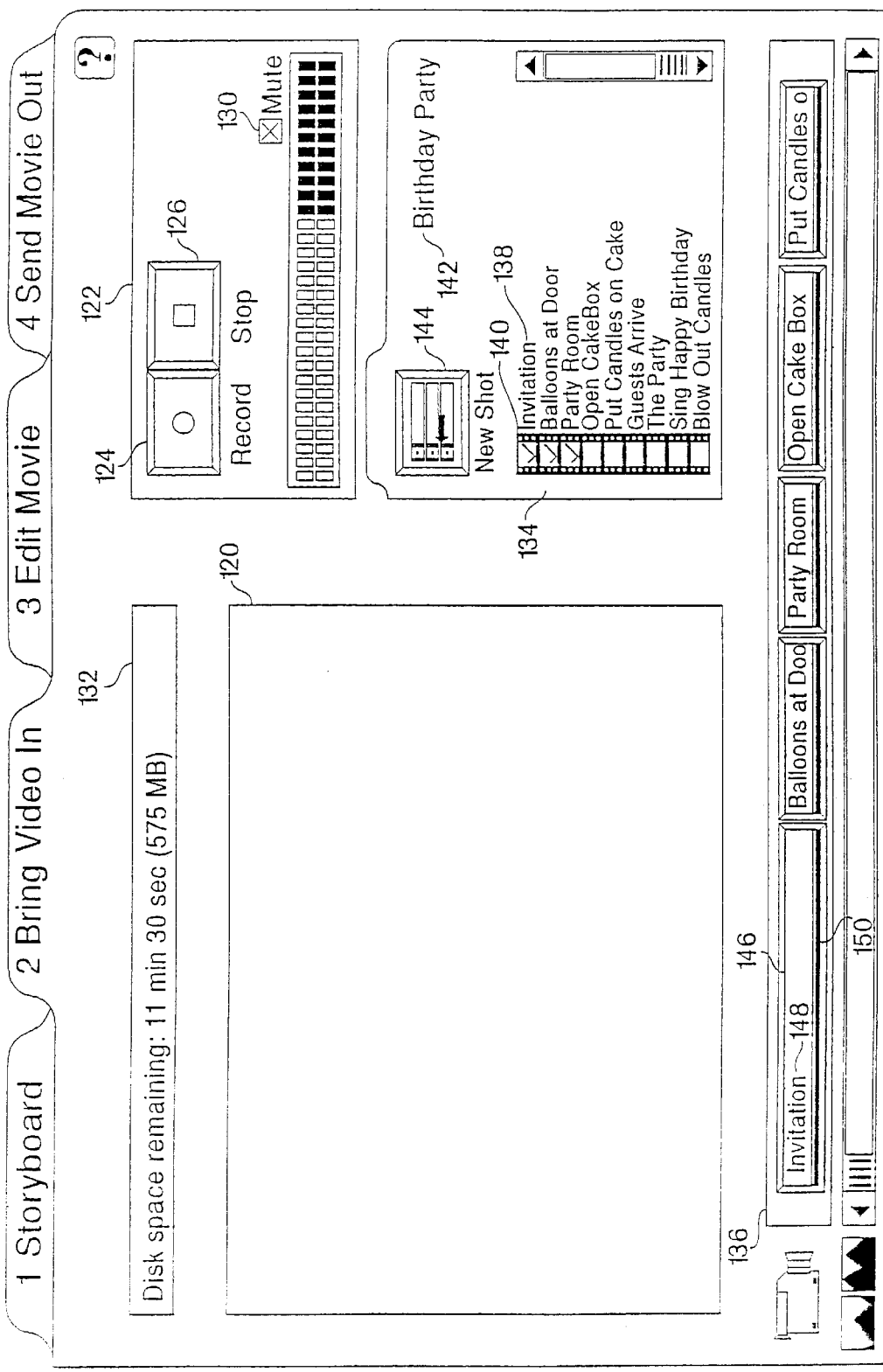
FIG. 8 is a graphic of a graphical user interface for providing capturing functions in accordance with one embodiment of the present invention.

The combination of the shot descriptions and clip descriptions are particularly useful in capturing motion video information from a video storage device, such as a camcorder, into a motion video data file where it can be edited on the computer. An interface 54 providing commands for capturing motion video, i.e., bringing motion video data into the computer system, is shown in FIG. 8. The interface for capturing motion video into the computer includes a display area 120, which displays motion video information currently being received by the computer as an input. For example, a user may be playing back a videotape on a camcorder connected as an input device through a video capture board to the computer system. If no video is available, the display area 120 can convey an instruction to connect a video source to the computer. A control 122 controls recording of the received motion video information. By selecting the record button 124, motion video information being displayed in region 120 is captured into a data file until the stop button 126 is selected. Audio levels may be displayed at 128 and output of audio information may be muted using selection area 130. A display region 132 also displays available disk area as a function of time of video information which can be captured. In this example, it is assumed that roughly 27.7 k is required for each frame, such that roughly 830 k is required for each second of video information. This value is generated by monitoring the available disk space, dividing the available space value by a target size per frame (resulting in a number of frames which can be stored), and converting that quotient into minutes and seconds using the time resolution of the video, e.g., 30 frames per second.

A storyboard region is also displayed at 134 to indicate the plan of shots for the selected video program for which data is being captured. A timeline 136 is displayed which corresponds to the storyboard region 134. The storyboard region 134 includes, for each shot, its title 138, an indication 140 of whether or not the video data for the shot has been captured (determined using the reference field 100, FIG. 6), and on indication 142 of the title of the video program. A selection button 144 also allows for the insertion of a new shot, similar to the operation performed using button 84 in FIG. 5. Using the storyboard display 134, shots may be selected, inserted or deleted. Such functionality can be provided using standard techniques. Because operations on this interface affect the data structure shown in FIG. 6, changes made to the storyboard through the interface 54 of FIG. 8 are also reflected in the storyboard interface 52 shown in FIG. 5, as will be described below. Similarly, the timeline 136 has a display object 146 for each clip which is captured. The display object has a size, which is calculated as a function of the duration of the clip, and a title 148, obtained from the title of the corresponding shot description. A bar 150 also indicates whether audio is associated with the clip.

Motion video information is captured using this interface 54, and is tied directly to a selected shot. Upon initiation, the first shot in the storyboard for which motion video information has not yet been captured is selected. However, the user may select any given shot in the storyboard region for capturing associated motion video information. After a user selects a shot, or if no shot is selected, the user may cause motion video information to be input to the computer by playing a portion of a videotape from a camcorder device. The input motion video data is displayed in display area 120. The user depresses button 124 to begin capture. The captured motion video information is stored in a data file on the hard disk of the computer system. The file name of that file is associated with the selected shot, if any, and corresponding clip in the storyboard and timeline. If no shot is selected, then a new media file is created in a library or directory of files. When the user has finished capturing the selected motion video information, the stop button 126 is depressed and the data file on the hard disk is closed.

By capturing motion video information in this manner, the motion video information is automatically and immediately associated with a selected shot. By capturing video information directly into the timeline representing the motion video program, the need for a "bin" of motion video data files is eliminated and the user interface is simplified. When all shots have been associated with clips, a message may be displayed to the user that tells the user to continue to the next selectable interface, for editing the movie. Nonetheless, the user may still add shots and capture more video.

Figure 15:
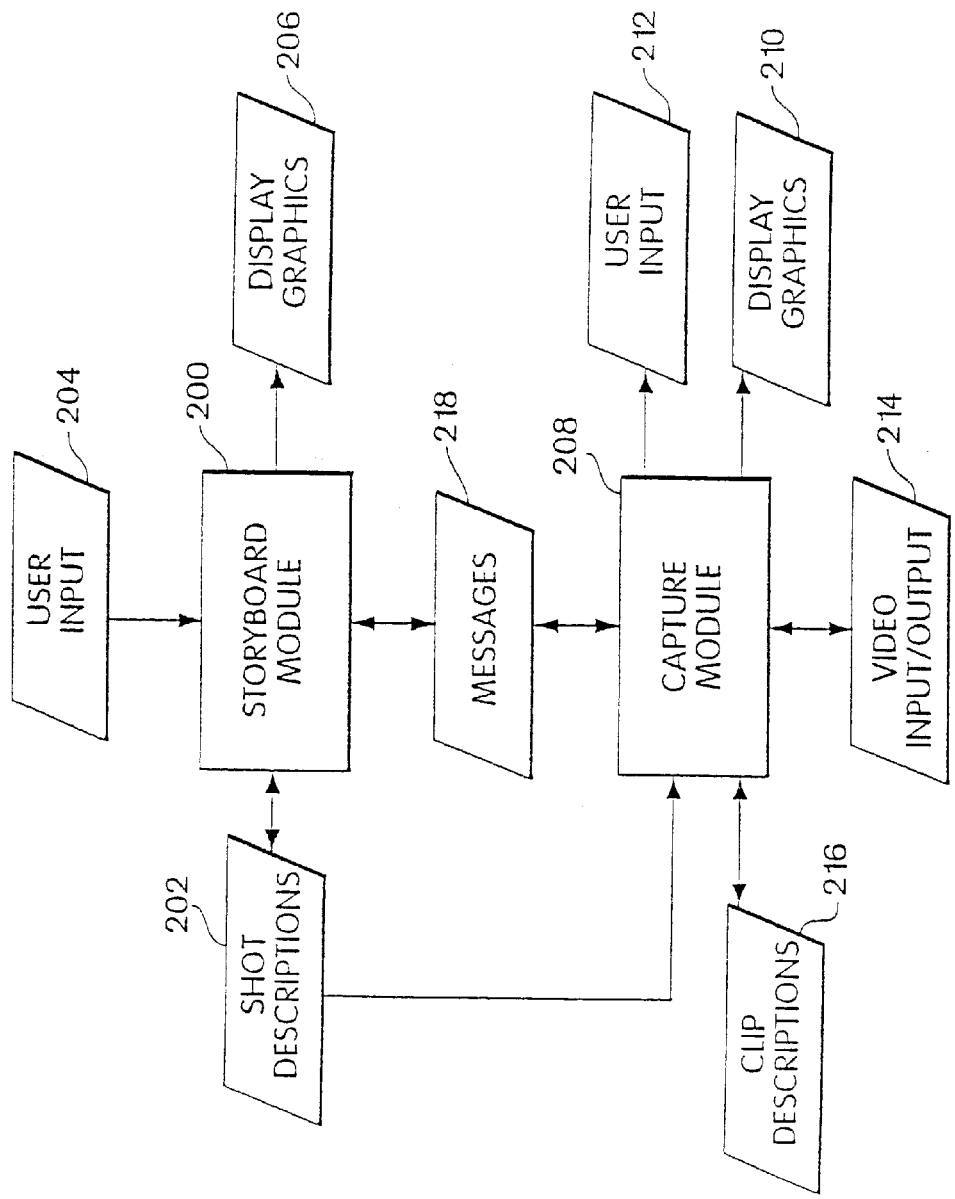
FIG. 15 is a block diagram illustrating interaction between a module for maintaining and displaying a storyboard and a module for creating and maintaining clip description of a composition.

The interaction of the clip and shot descriptions will now be described in connection with FIGS. 15 and 16. A storyboard module 200 is a part of the computer program which handles operations on shot descriptions of a storyboard. It receives as an input, and outputs, shot descriptions 202. User input 204 is processed to change the data in the shot descriptions and to generated the displayed graphics 206 of the storyboard interface 52. Similarly, a capture module 208 processes the shot descriptions and the clip descriptions 216 to provide the display graphics 210 of interface 54. It also processes user input 212 to perform operations such as capturing data or inserting and deleting shots. Video input and output 214 is controlled into data files. The clip descriptions 216 are created and modified according to the selected shot and the name of the data file into which the data is captured. When an operation is performed on a clip in the timeline, the capture module 208 modifies the corresponding clip description 216. The corresponding shot is modified via a message passing technique, indicating a clip that is modified and the operation causing the modification.

Figure 16:
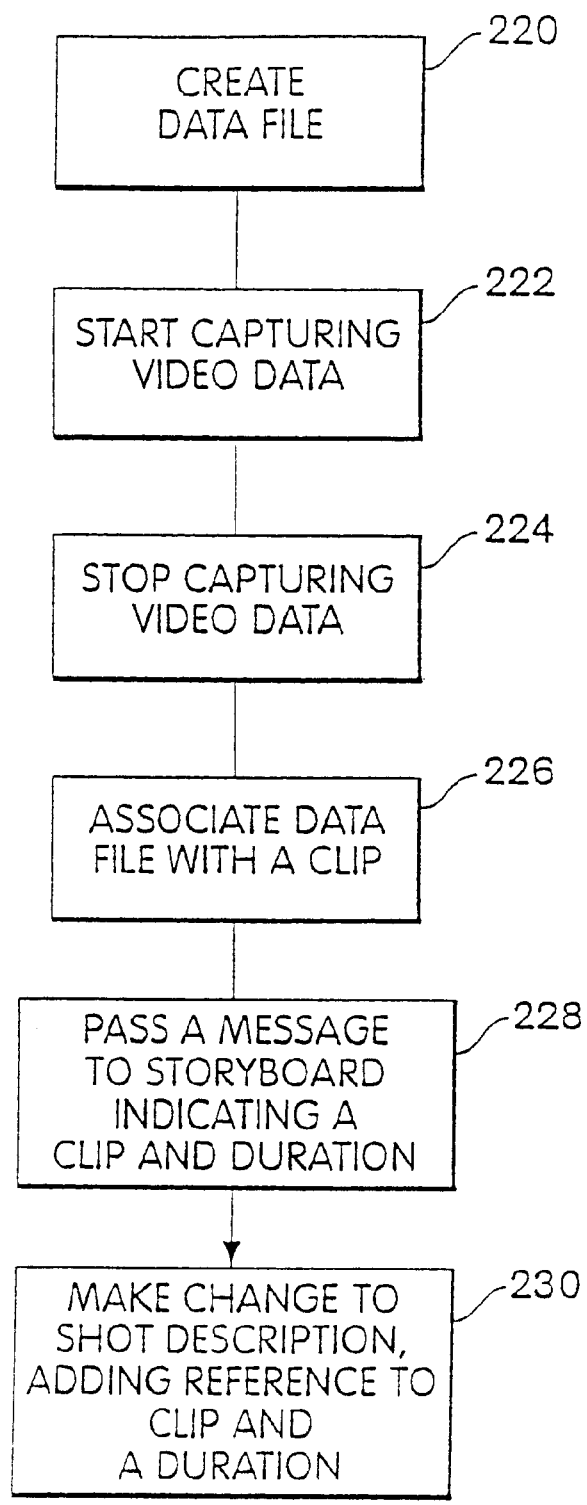
FIG. 16 is a flowchart describing how clip descriptions and shot descriptions are synchronized during capture of motion video information.

FIG. 16 is a flowchart describing an example operation in which the clip descriptions and shot descriptions are synchronized. Given a selected shot and a command to begin capturing video data, a data file for the video information is created in step 220. Video data is then captured in steps 222 and 224. A clip description is created with a reference to the data file, and start and stop times corresponding to the beginning of the file in step 226. This clip description is stored in a data structure 88 which represents the sequence of clip descriptions which make up the timeline. A message is then passed in step 228 to the storyboard indicating that a clip was created, having a duration. The selected shot description modifies its duration and pointer to reference the new clip description in step 230.

Figure 9:
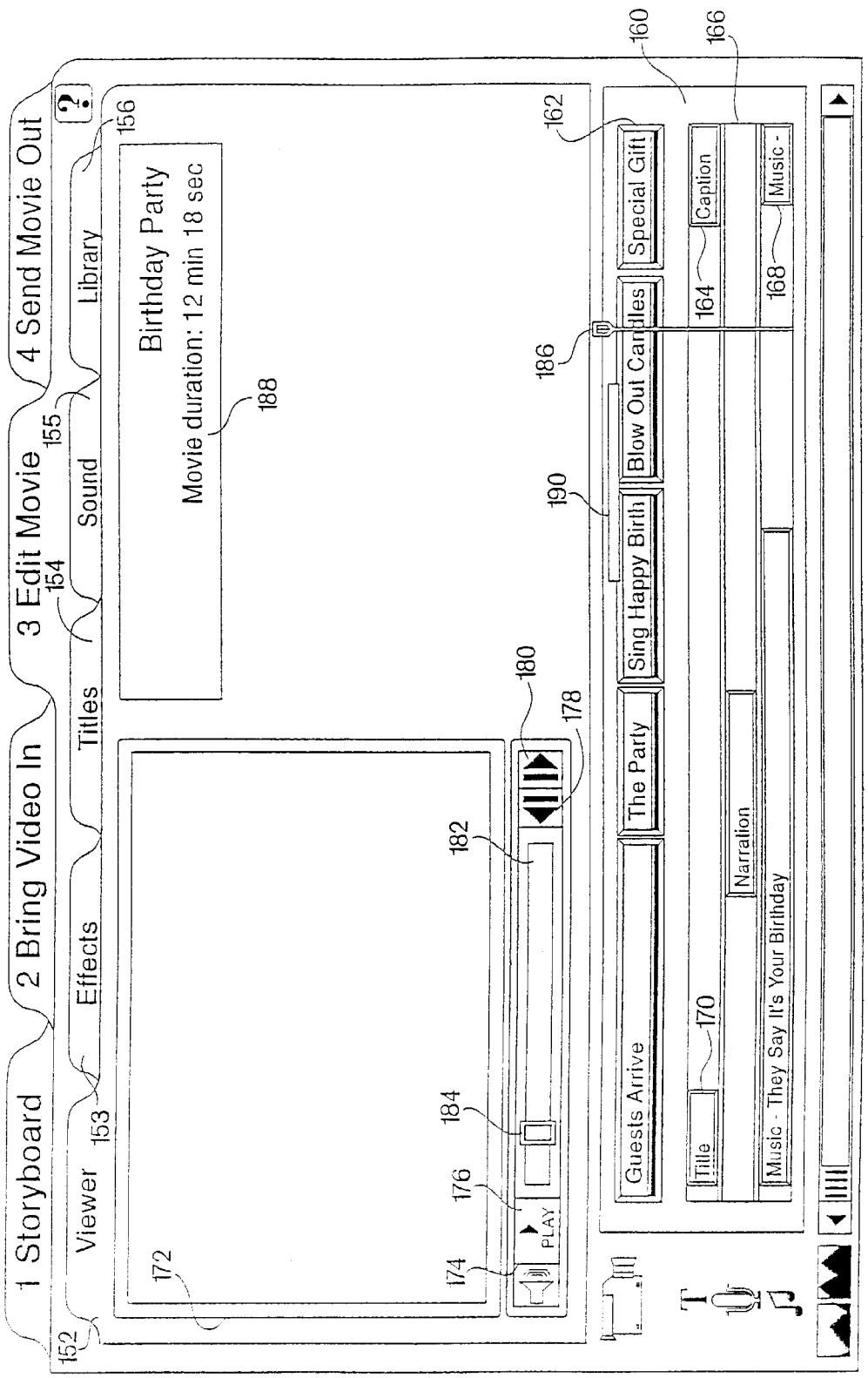
FIGS. 9–13 are graphics of graphical user interfaces for providing editing functions in accordance with one embodiment of the present invention.

After clips for a movie have been captured, more finely detailed editing of the video program can be started. Accordingly, another of the selectable interfaces 56 provides functions for editing a movie, as shown in FIG. 9 via several selectable interfaces 152–156. The interface for editing a movie has a timeline region 160, which includes a representation of a timeline 162, associated title track, 164 an additional audio track 166, and a soundtrack 168. A timeline is a time-based representation of a composition. The horizontal dimension represents time, and the vertical dimension represents the tracks of the composition. Each of the tracks has a fixed row in the timeline which it occupies. The video track is split into three rows, including the effect subtrack, the video media subtrack, and the audio subtrack. The size of a displayed element, such as element 170, is determined as a function of the duration of the segment it represents and a timeline scale, described below. Each element in the title, audio and soundtrack timelines has a position determined by its start time within the motion video program, a duration, a title, and associated data. Each track is thus represented by a structure similar to data structure 88, but audio tracks have references to data files containing audio information.

The timeline also has a scale which specifies how much time a certain number of pixels represents. To increase the scale means to increase the number of pixels that represent one time unit. Providing a mechanism to increase and decrease the time scale, allows a user to focus in on a particular location in the composition, or to have more of an overview of the composition.

Each of the selectable interfaces of the editing interface has a viewer window 172, which has the same size and location within each window. The viewer window 172 also has an associated timeline 174, representing the entire video program, which includes a play button 176, forward and backward skip buttons 178 and 180, and a position indicator 182, which points to the present position within the video program which is being played back. The indicator 184 is linked to another position indicator 186 in the timeline region 160. The various buttons 176, 178, 180 and indicator 182 can be used to control viewing of the video program being edited. The program can be played back at a full rate, paused to show a still frame and shuttled to view individual frames to the left and/or right at a number of speeds.

In the viewer interface 152, a display region 188 shows the title and duration of the video program. A user can play back the video program, adjust the duration of clips (by trimming), delete clips, insert clips and/or move clips within the video program. A segment in the timeline may also be split into two separate segments or clips. These operations can be performed by simple cut and paste operations on the timeline 162 which can be implemented using standard techniques. For example, deletion of a clip from the timeline replaces the clip description with a hole of the same duration. The reference to this clip is removed from the corresponding shot description.

For rearranging clips on the timeline, clips are insertable at transitions and can be performed using a "drag and drop" operation, which can be implemented using standard techniques. Insertion of a clip involves creating a hole the size of the clip, then replacing the hole with the clip to be inserted. The hole may be created after a selected clip, at a transition point nearest the drop or anywhere beyond the end of the last clip in the timeline. It may be desirable to show what the timeline would look like if a drop were to occur when the user has a drop position selected, but prior to the drop operation being performed. An inserted clip may be selected by a copy or cut operation, followed by a paste operation; a selection from a library; or by dragging a selected clip to the desired location (which is in essence a combination of cut and paste operations).

Trim operations add or remove frames from selected edges of segments in the composition. A trim right operation either removes frames from an incoming edge or adds frames to an outgoing edge. A trim left operation either removes frames from an outgoing edge or adds frames to an incoming edge. This operation is performed by simply adjusting the start or stop frames in the clip description. A trim operation accordingly cannot add or remove frames beyond the boundary of the data file used by the clip. To provide additional boundary conditions on the trim operation, the start point may be required to precede the stop point and define at least one frame. Trim operations other than edge trims may provide more advanced functionality, but are likely not to be needed by the nonprofessional. The selection of a right trim or left trim operation uses some mechanism for the user to select an edge and to indicate that a trim operation is desired. One example mechanism which may be used are "trim handles" which are displayed on the left and right ends of a displayed clip when a user selects the clip. The user may then drag the edge to the desired trim point.

Many other more advanced operations may be performed on timelines. A timeline behavior specification is provided by FIGS. 17a–24m, and describes in more detail the desired behavior in response to most user operations.

FIGS. 17a–24m are diagrams which show insertion, deletion, and trimming operations in a timeline which are possible by adding frames or clips and by removing frames or clips. These figures are shown as examples only and many other operations are possible. FIG. 17a shows that a selected clip A may be indicated by a long clip which has, for example, a length of ten frames or a short clip which has a length of five frames. Other clips B, C and D are shown in FIG. 17b. Generally holes may be shown with their length as eleven frames. A playout position is indicated in the clip as shown in FIG. 17c. A playout position may be indicated in a hole and shown in FIG. 17d, while a selected transition may be indicated as shown in 17e.

Figure 18A:
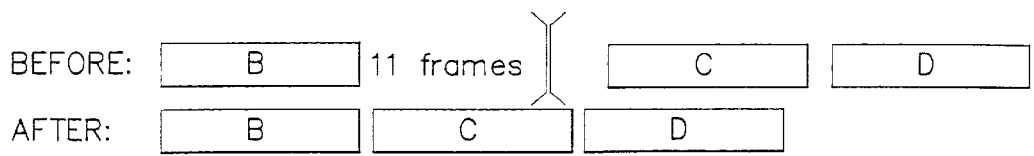
FIGS. 18a–18b are a representation of timeline behavior produced in response to a user operation.
Figure 18B:
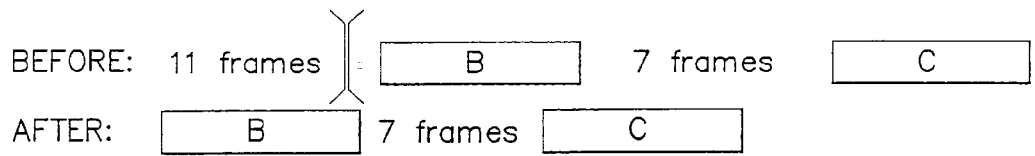

FIGS. 18a–b illustrate behavior which occurs when holes are removed from a timeline. As shown in FIG. 18a, a hole which is eleven frames in length exists between clips B and C. FIG. 18a then illustrates the timeline after the hole has been removed. Similarly, FIG. 18b illustrates a hole before clip B and a hole before clip C. FIG. 18b then illustrates the timeline after removal of the first hole.

Figure 19A:
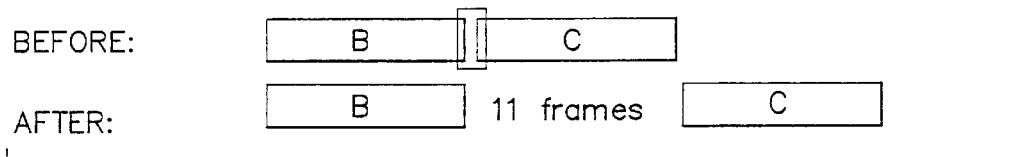
FIGS. 19a–19d are a representation of timeline behavior produced in response to a user operation.
Figure 19B:
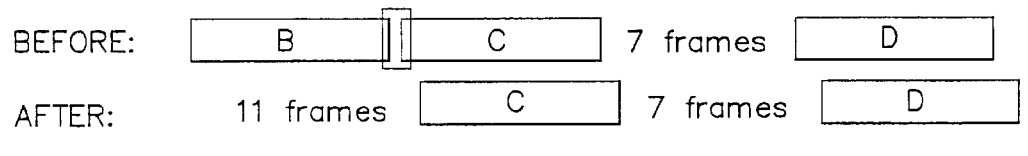
Figure 19C:
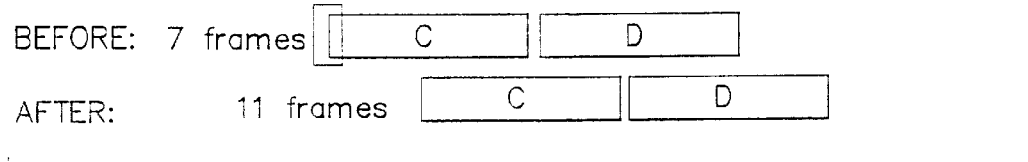
Figure 19D:
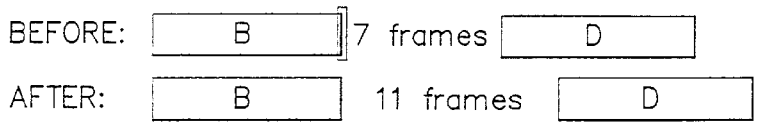

FIGS. 19a–19d illustrate behavior which occurs by adding a hole. For instance, in FIG. 19a a transition is selected between clips B and C. FIG. 19a then illustrates the timeline after a hole has been added between clips B and C. FIG. 19b illustrates a timeline having a hole between clips C and D. FIG. 19b then illustrates a timeline after a hole has been added following clip B. FIG. 19c illustrates a transition before clip C, then FIG. 19c illustrates a hole which is added before the selected transition in clip C. Since a hole seven frames in length already existed before the transition in clip C, as shown before in FIG. 19c, only four frames need to be added to create a hole before the selected transition. Similarly, in FIG. 19d there is a seven frame gap between a selected transition in clip B and clip D. FIG. 19d then illustrates a hole which has been added between clips B and D by adding four frames to the existing seven frames.

Figure 20A:
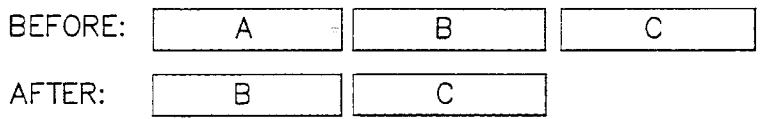
FIGS. 20a–20f are a representation of timeline behavior produced in response to a user operation.
Figure 20B:
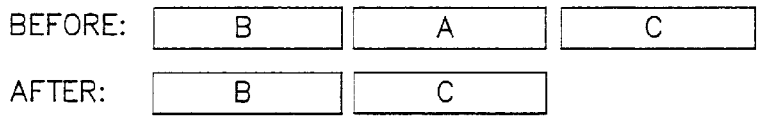
Figure 20C:
Figure 20D:
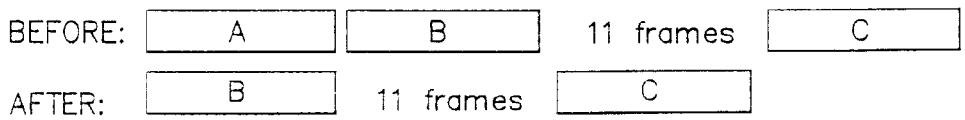
Figure 20E:
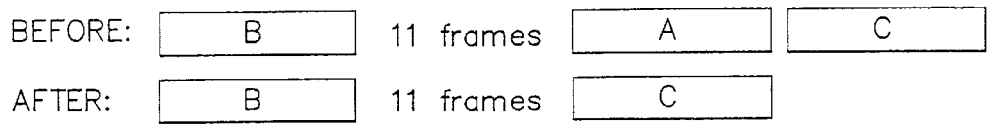
Figure 20F:
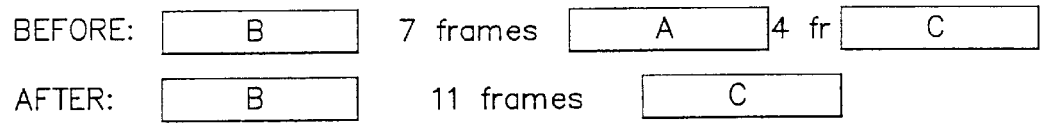

FIGS. 20a–20f illustrate delete/cut behavior. FIGS. 20a–20c do not include a hole before or after the deletion. FIG. 20a illustrates three clips in a timeline.

FIG. 20a then illustrates deleting a front clip A which results in a timeline as shown in FIG. 20a having clips B and C. FIG. 20b illustrates three clips including a middle clip A. FIG. 20b then illustrates a timeline after a middle clip A has been removed. FIG. 20c illustrates three clips with a last clip A, then FIG. 20c illustrates deleting the last clip A to result in a timeline having only clip B and C.

FIG. 20g illustrates a timeline with three clips A, B and C including a hole which is eleven frames in length. FIG. 20h illustrates a timeline after clip A has been removed in which the hole is preserved between clips B and C. FIG. 20i illustrates a timeline having three clips with a hole between clip B and A. FIG. 20j illustrates removing clip A, resulting in a timeline including clips B and C with the hole now between clips B and C. FIG. 20k illustrates three clips wherein clip A is included in the hole between clips B and C. FIG. 20l illustrates a timeline which results after deleting clip A from the hole.

Figure 21A:
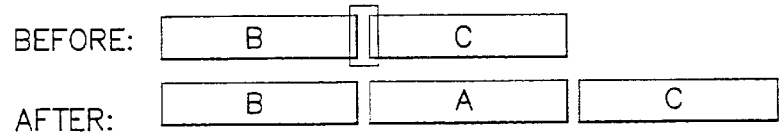
FIGS. 21a–21d are a representation of timeline behavior produced in response to a user operation.
Figure 21B:
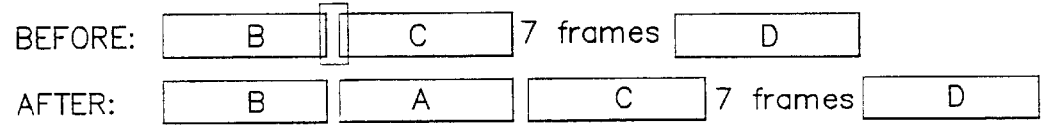
Figure 21C:
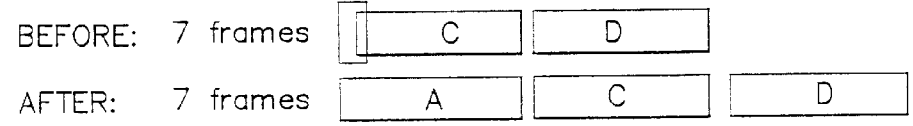
Figure 21D:
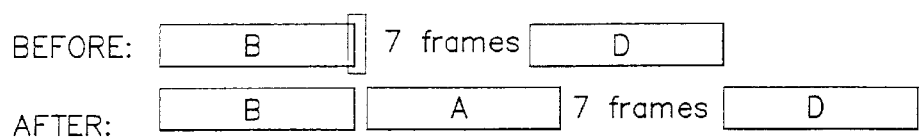

FIGS. 21a–21d illustrate pasting a clip into a timeline. For example in FIG. 21a, a timeline includes clips B and C with a transition between them. Clip A is pasted between clips B and C resulting in the timeline next shown in FIG. 21a. In FIG. 21b, a timeline is shown with a hole beyond a selected transition. FIG. 21b then illustrates a timeline after a clip A has been inserted between clips B and C. FIG. 21c illustrates a timeline having clips C and D including a hole between a selected transition in clip C. FIG. 21c then illustrates a clip which has been pasted before the selected transition in clip C. FIG. 21d illustrates a hole which is existing between the transition in clip B and clip D. A track as shown next in FIG. 21d which illustrates a clip A has been added after the selected transition in clip B.

Figure 22A:
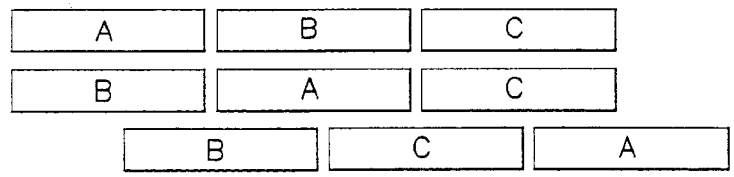
FIGS. 22a–22g are a representation of timeline behavior produced in response to a user operation.
Figure 22A:

FIGS. 22a–22g illustrate the behavior which results from dragging a clip from a timeline. In FIG. 22a, clip A, which is included in a timeline also including clips B and C, is dragged from the timeline and dropped between clips B and C. The third line of FIG. 22a illustrates clip A which is dragged and dropped at the end of the timeline after clip C. The fourth line of FIG. 22a illustrates dragging clip A and dropping it eleven frames after the end of the timeline.

Figure 22B:
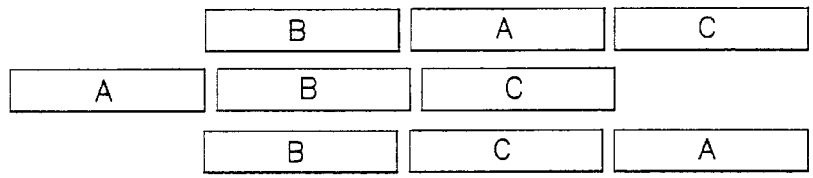
Figure 22B:

FIG. 22b illustrates a timeline in which clip A exists in the middle of clips B and C. Clip A may be dragged and dropped before clip B. The third line of FIG. 22b illustrates a timeline which results after clip A is dragged and dropped at the end of the timeline. Clip A may also be dragged and dropped eleven frames after the end of the timeline.

Figure 22C:
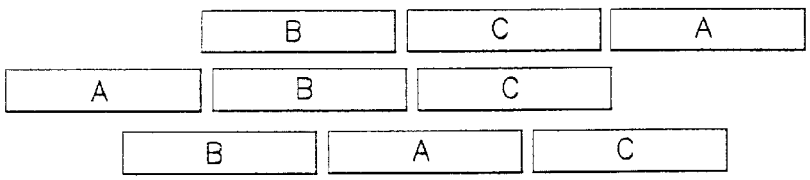
Figure 22C:

FIG. 22c illustrates a timeline including clip A at the end of the timeline. In this example, the length of the timeline is not preserved after a clip is dragged from the end of the timeline. Clip A may be dragged to the beginning of the timeline before clip B or it may be dragged and dropped between clips B and C. Similar to the above examples in FIG. 22, clip A may be dragged to the end of the timeline and dropped eleven frames after clip C.

Figure 22D:
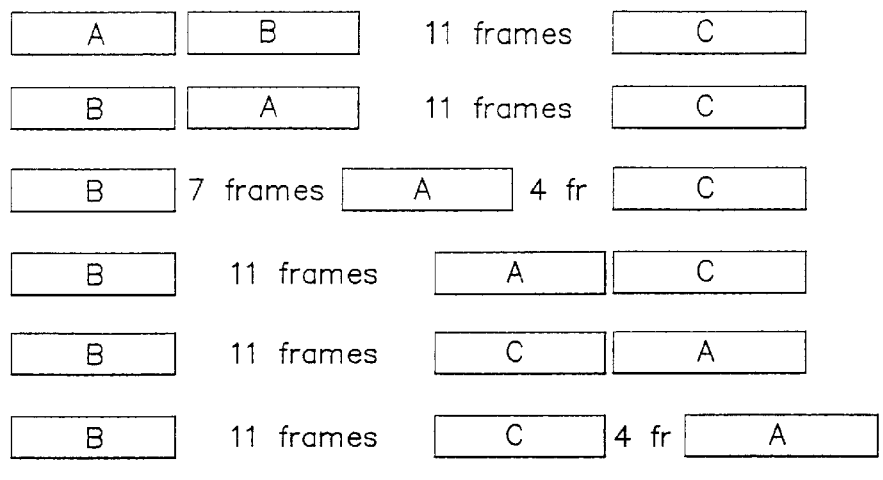

FIG. 22d illustrates a clip A in a timeline which may be dragged so that the length of the timeline is preserved. For example, clip A may be dragged and dropped between clip B and a hole. In addition, clip A may be dragged and dropped seven frames after the start of the hole or it may be dropped after the hole, but before clip C. Clip A may also be dropped at the end of the timeline following clip C or it may be dragged and dropped, for example, four frames after the end of the timeline.

Figure 22E:
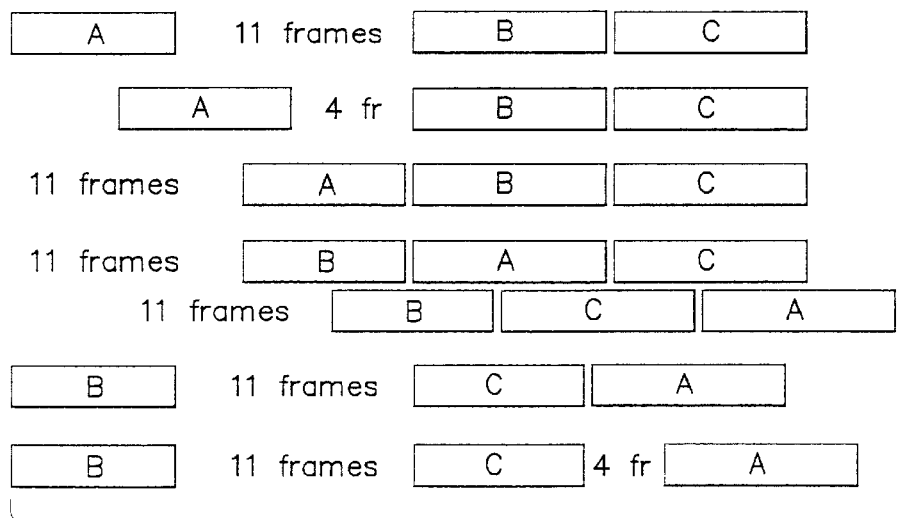

FIG. 22e illustrates further examples of dragging clip A and preserving a hole and the length of a timeline. For example, clip A may be dragged into the middle of a hole, but before clip B or it may be dragged before clip B or between clips B and C. Clip A may be also dragged to the end of the timeline and may be dropped four frames after the end of the timeline.

Figure 22F:
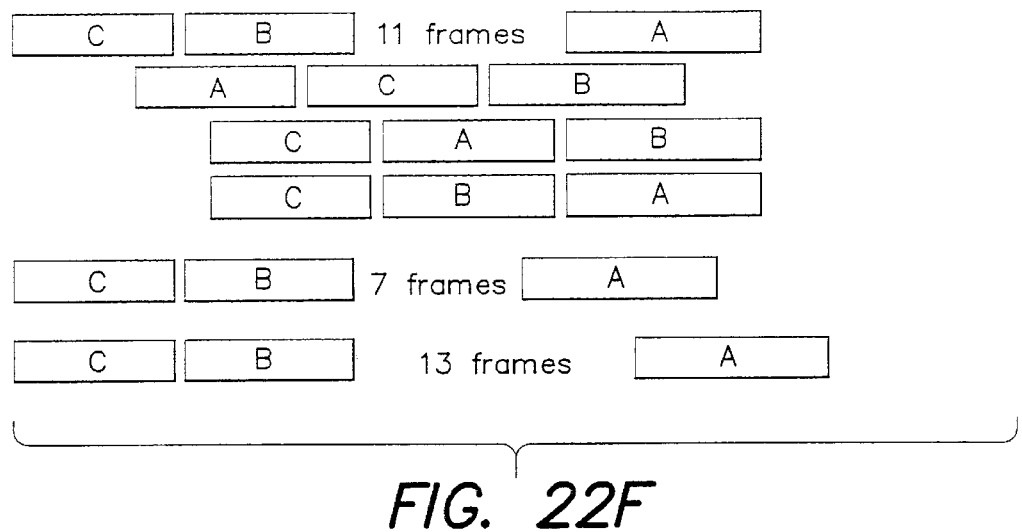

FIG. 22f illustrates dragging a last clip in a timeline without preserving the length of the timeline. For example, clip A may be dragged to the beginning of a timeline and as shown, the hole after clip B is not preserved. Clip A may be dragged and dropped between clips C and B or may be dragged and dropped at the end of clip B. Clip A may also, for example, be dragged and dropped seven or thirteen frames after the end of clip B and after the start of a hole.

Figure 22G:
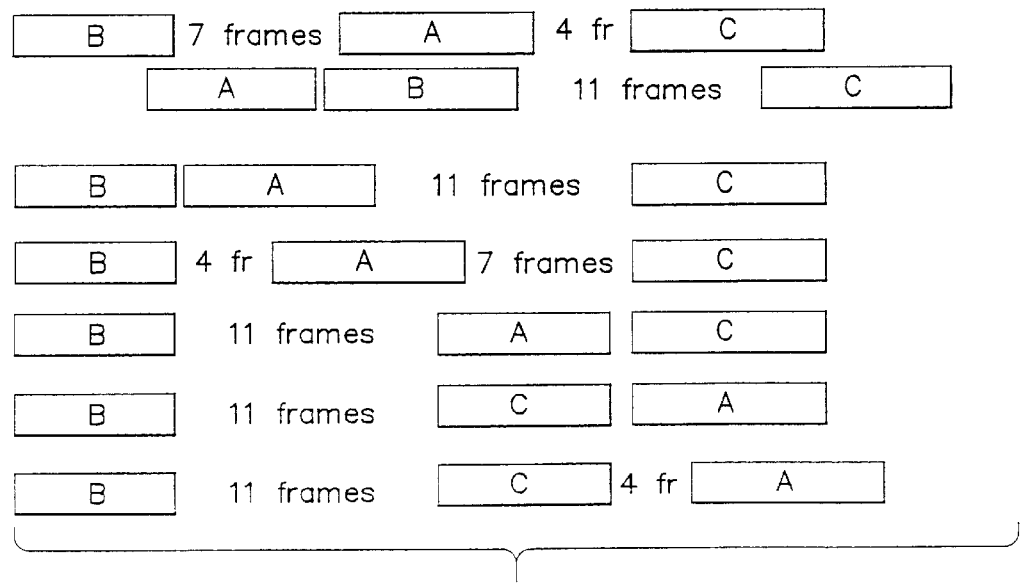

FIG. 22g illustrates dragging a clip which is surrounded by a hole. Clip A may be dragged to the beginning of a timeline and dropped before clip B as shown in FIG. 22g. These operations preserve the hole and the length of the timeline. For example, clip A may be dragged and dropped after clip B but before the beginning of the first hole. Clip A may also be dragged so that it is dropped four frames after the beginning of the hole or it may be dropped between the end of the hole and the beginning of clip B. In addition, clip A may be dragged to the end of clip B or it may be dragged and dropped four frames after the end of the timeline.

Figure 23A:
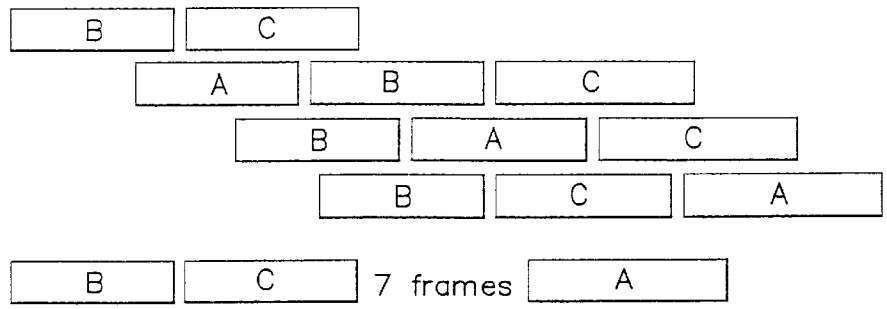
Figure 23B:
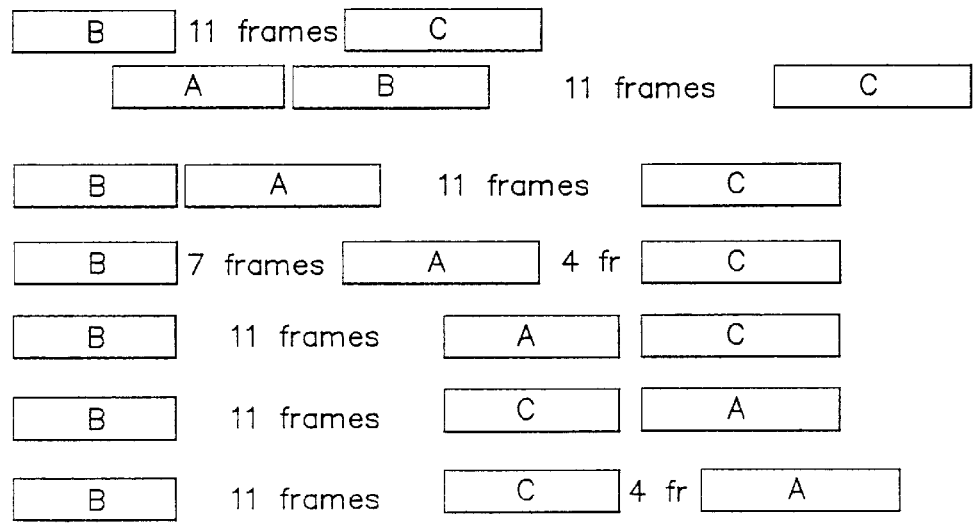
Figures 23C, 24A, 24B:
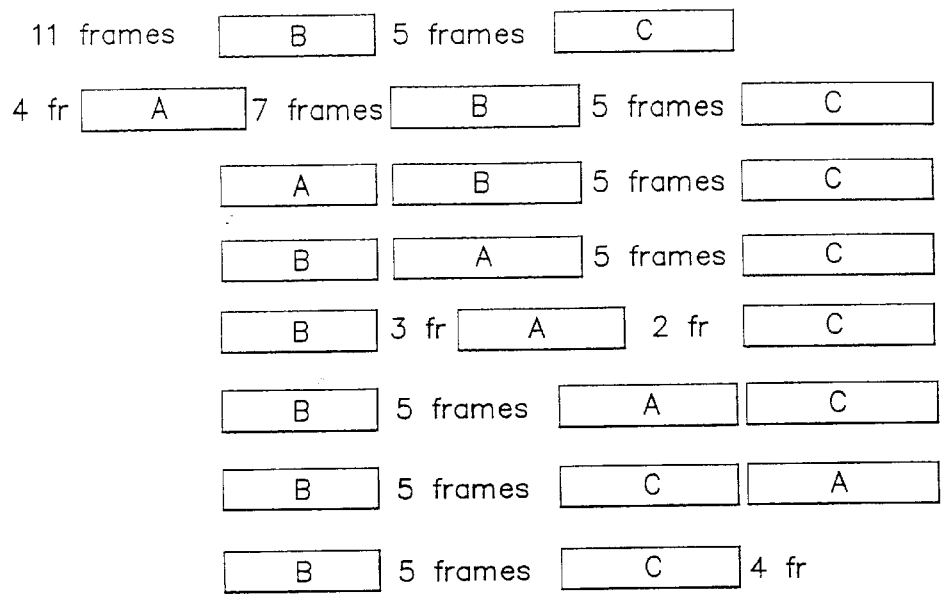

FIGS. 23a–23c illustrate operations performed by dragging a clip from an outside timeline. FIG. 23a illustrates a timeline with clips B and C. However, as shown in the next line, clip A may be dragged from an outside timeline and dropped before clip B. Clip A may be dropped also between clips B and C, after clip C or, for example, seven frames after the end of clip C.

FIG. 23b is similar to FIG. 23a except that a hole exists in the timeline between clips B and C. The same functions of dragging and dropping clip A may be performed while preserving the hole between clips B and C.

FIG. 23c illustrates a timeline including two holes and a clip B and C. Clip A may be dragged from an outside timeline and dropped four frames from the start of the timeline. Clip A may also be dropped before clip B, after clip B, into a second hole after clip B or in a second hole five frames after clip B. Clip A may also be dropped at the end of the timeline after clip C or, for example, four frames after the end of the timeline.

Figure 24C:
Figure 24C:
Figure 24D:
Figure 24D:
Figure 24E:
Figure 24E:
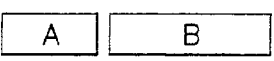
Figure 24F:
Figure 24F:
Figure 24G:
Figure 24G:

FIGS. 24a–24i and 24k–24m illustrate trim behavior which results from trimming clips in a timeline. FIG. 24a illustrates clips A and B and the result from trimming clip A such that the inpoint is trimmed in five frames by removing five frames from the beginning of clip A. As shown, the length of the other items in the timeline are preserved. FIG. 24b illustrates a clip A and B where the inpoint is trimmed out by adding five frames prior to clip A. The result is shown in the second line of FIG. 24b with a result of clips A and B being of equal length. FIGS. 24c and 24d illustrate trimming clip A such that the outpoint is trimmed in five frames by removing five frames from the end of clip A (FIG. 24c) or is trimmed out five frames by adding five frames subsequent to the end of clip A (FIG. 24d). FIG. 24e illustrates a timeline having a hole before clip A. Clip A is trimmed at its inpoint in five frames and the result is shown in the second line of FIG. 24e. FIG. 24f illustrates a hole before clip A and a trim operation performed on clip A trimming the inpoint out five frames. FIG. 24g and FIG. 24h illustrate a timeline having a hole before clip A and trimming the outpoint in by five frames (FIG. 24g) and trimming the outpoint out by five frames (FIG. 24*h*). FIG. 24*i* illustrates a timeline having a hole after a clip A and before clip B. FIG. 24*i* and FIGS. 24*k* and FIG. 24*K* through 24*m* illustrate a hole after a selected clip A and before a clip B. The second line of these examples illustrate the result of the timeline after trimming clip A in and out at its inpoints and outpoints by five frames.

When a user has edited the clips of the video program in more detail, the next step to perform in the editing process is the addition of special effects at transitions. However, the user may access these special effects at any time and is not required to complete all trims prior to creating any effects.

Figure 10:
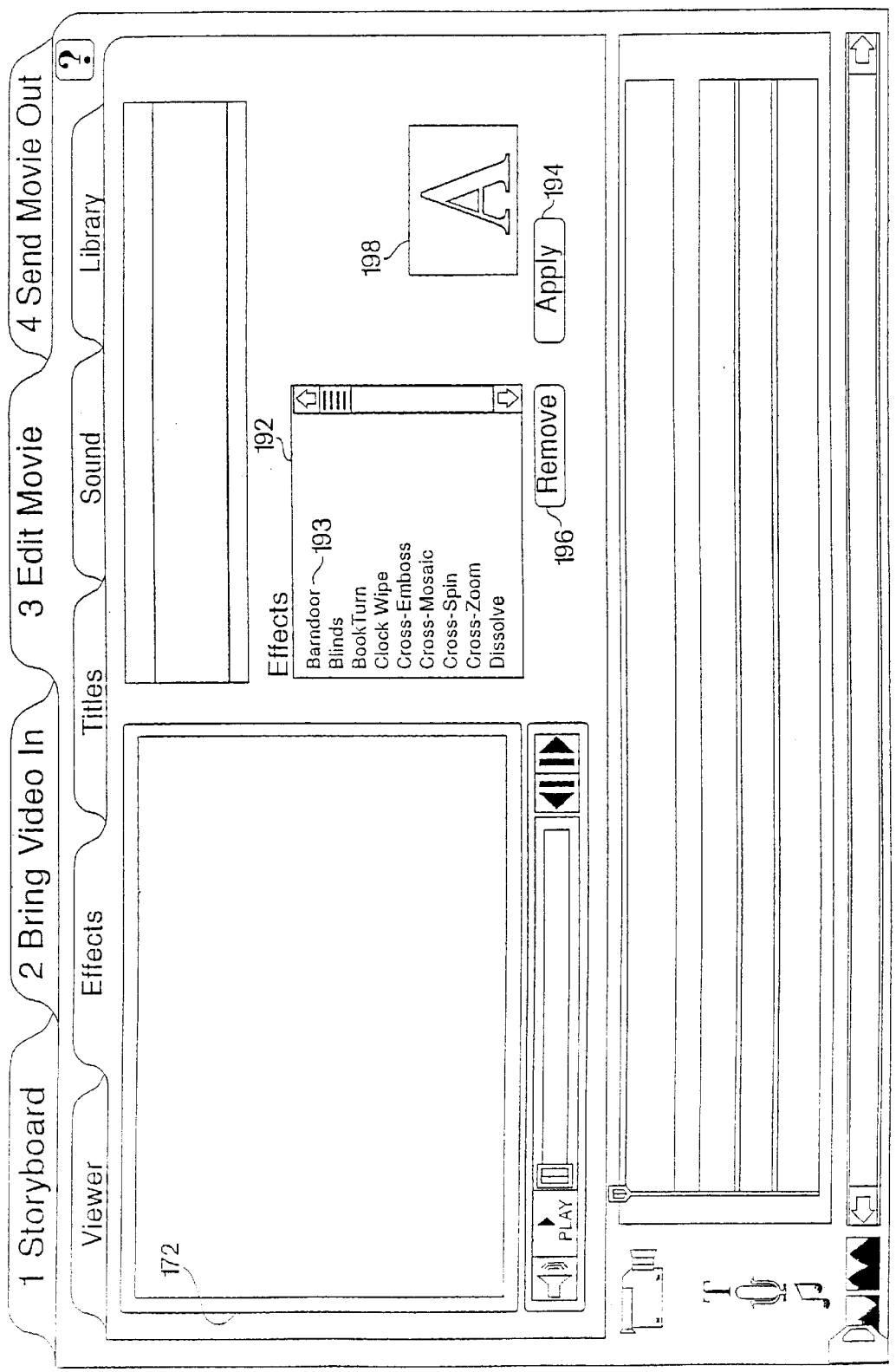

A second selectable interface 153 for editing the motion video includes operations for selecting special effects to be applied to transitions between two clips. Given two selected clips, a selected effect can be applied to the transition. A corresponding object 190 in FIG. 9 is displayed on the timeline, describing the transition. A suitable interface for providing selection of an effect and clips is shown in FIG. 10.

A list of possible effects is provided at region 192. Each effect has a title 193 which refers to a computer program which causes the effect to be made. The effect may be applied by selecting button 194 and is applied to the transition closest to the current position on the timeline. The effect may be removed, and replaced by a straight cut, by selecting button 196. A selected effect can be previewed in window 198, for example by "double-clicking" on the name in the effects window 192. Each effect has a corresponding file in which the effect has been created using graphics of the letters A and B, for this purpose.

When an effect is selected, an effect segment is created in the effect subtrack of the video track, with a default duration, e.g., one second. The effect as applied to the transition is rendered in the background and associated with the segment. When displayed and selected on the timeline, the effects segment may be trimmed. Such trimming may be implemented in the same manner as a trim on a regular clip.

Figure 11:
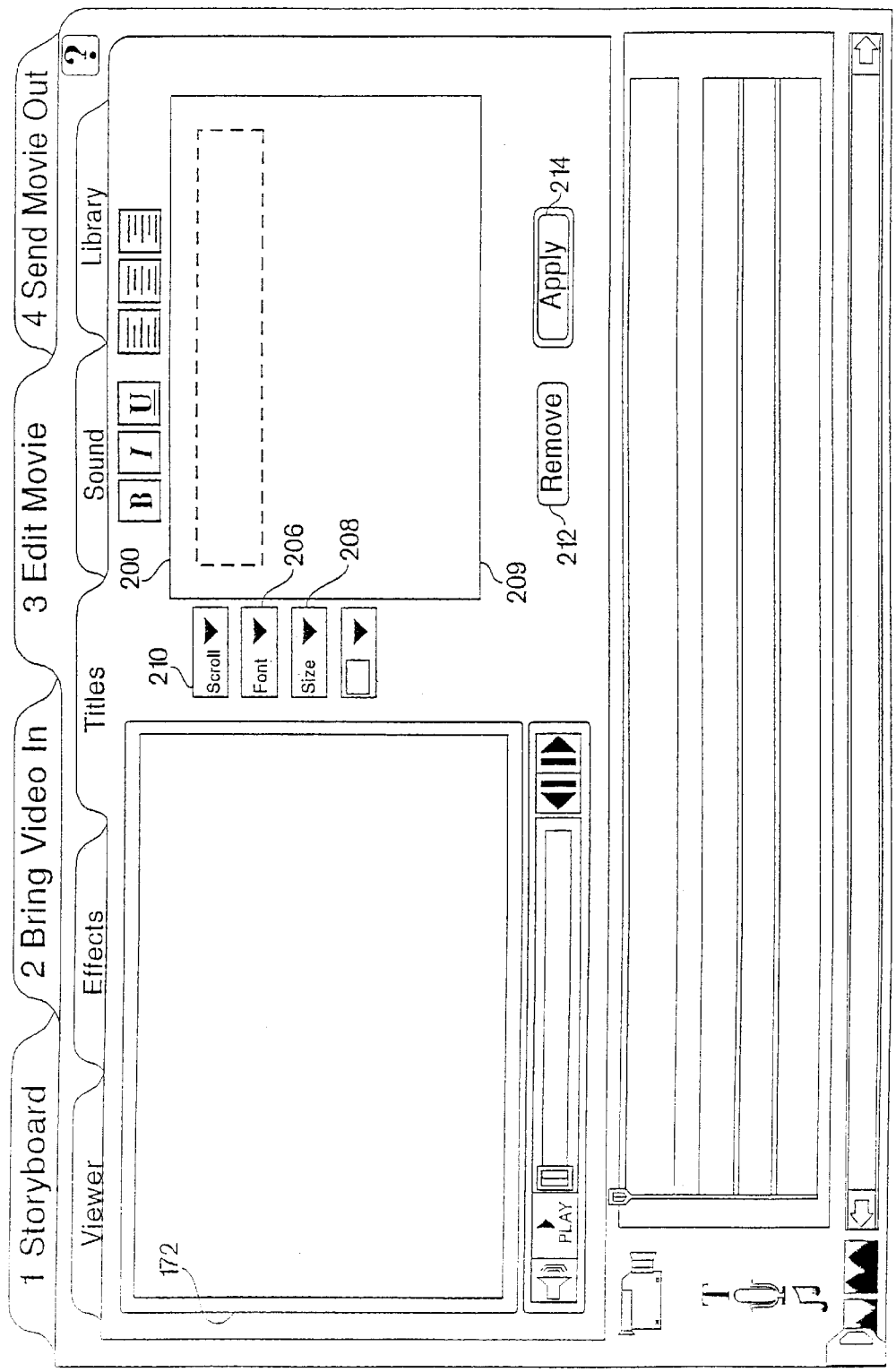

After addition of special effects, such as transition effects, to the motion video program, it is common to add titles next. Operations enabling a user to add titles to the video program are provided through interface 154, such as shown in FIG. 11. While titling operations and how they are performed on motion video are known in this art, this particular interface provides an easy mechanism for adding titles. This interface includes an editing region 200 and format selection buttons 202 and 204. Buttons 202 allow bold, italic and underlining formatting, while buttons 204 adjust justification. Font and size are selected via a menu style interface 206 and 208 respectively. Additional options for scrolling are provided at 210. Scrolling can be made left to right, right to left, top to bottom, or bottom to top. A titling effect can be removed or applied through selection buttons 212 and 214 respectively. This information input through this interface is used, using known techniques, to apply the title to the video information and to display the effect in the display region 172. However, the video data file of the clip to which it is applied is not modified. The titling information may be finally applied, for example, only when the video program is output in final form. In this way, titles may be added and removed more easily.

Using the titling interface, when no scrolling option is enabled, the dimensions of the space which can contain text is limited to the frame size, which in this case is represented by the canvas area 209. If the vertical scroll option is enabled, then the width of the canvas is the width of the video image, but the height is indefinite. If the horizontal scroll option is enabled, then the height of the canvas is the height of the video image and the width is indefinite. The length of the title may be the length of any associated video clip or the length of a hole over which it is created. When this interface is active, all modifications to the timeline are done to the title track.

Figure 12:
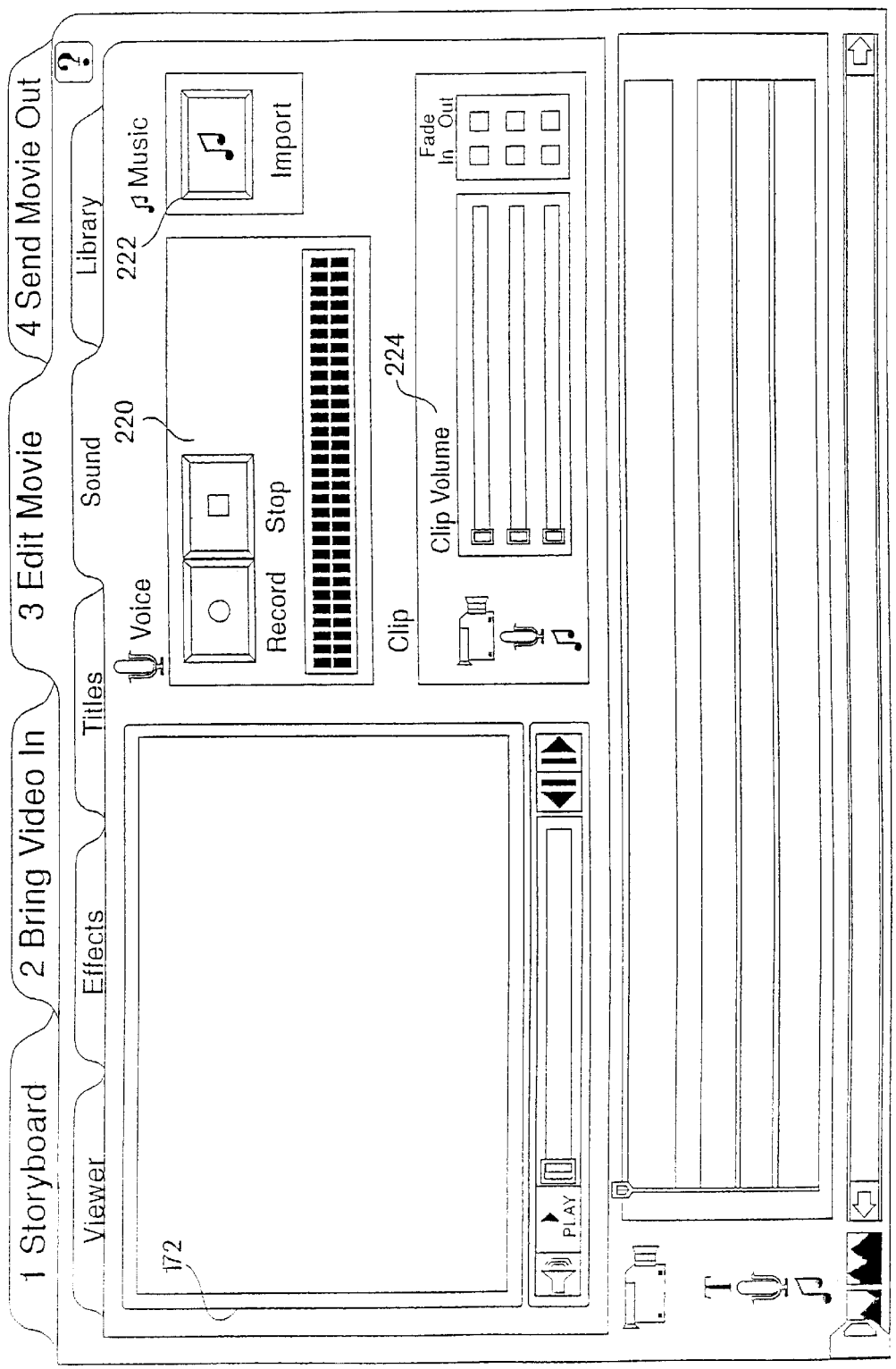

Typically, one of the final steps of the process of making a video program involves "sweetening" of the sound or audio tracks. This involves more detailed editing of the audio tracks. Another interface 155, shown in FIG. 12, provides editing functions for sound. Using this interface, all modifications to clips, including creation and deletion of clips, operate on one of the audio tracks. Given a selected point in the video program, a voice can be captured directly into the timeline in a manner similar to the way video is captured, via interface 220. Such an operation automatically creates a voice-over clip on the voice-over track. Similarly, music, such as from a CD-ROM, can be imported using interface 222. Such an operation automatically creates a sound clip on the soundtrack. Given a selected clip of voice or music information, or from the video/audio timeline, the volume of each selected track can be adjusted using interface region 224. It is also possible to select fade-in, fade-out options. Given the inputs provided through this interface, the operations to be performed are implemented using known techniques.

Figure 13:
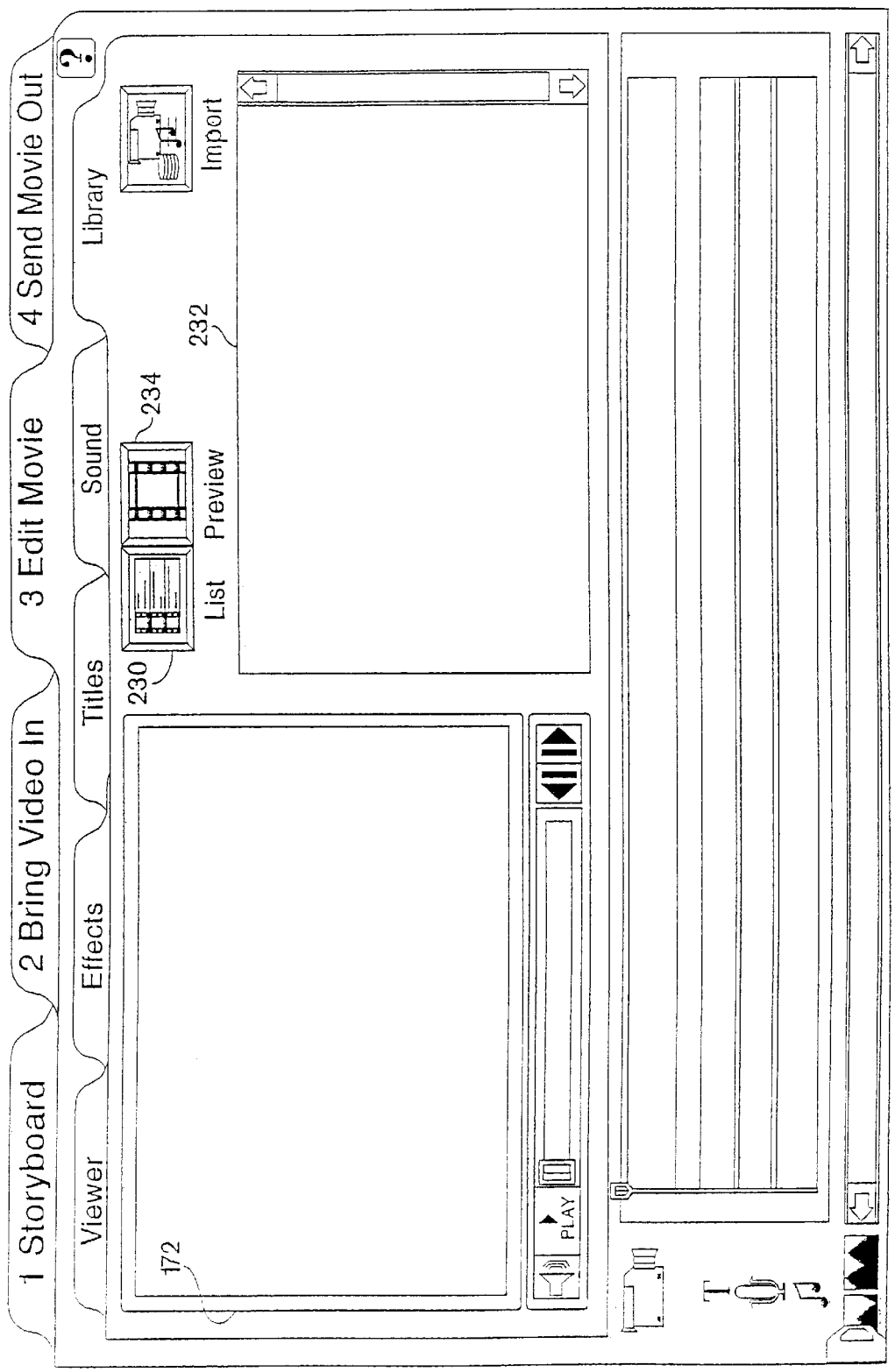

Finally, a library of audio and video information can be provided and accessed through a library interface 156, as shown in FIG. 13. A list operation invoked through button 230 causes a list of the available clips to be displayed in region 232. The available clips are all media clips which have been digitized or imported for use in a composition, for example, through the "Bring Video In" interface or through the "Sound" interface. The list operation involves a directory lookup to be performed by the computer on its file system, for example. The list view shows clips in a manner similar to the storyboard of interface 52. For each clip, its date, type, duration and description are displayed. These fields are editable. The preview button 234 allows a user to see one clip at a time from the library instead of an entire list. In this mode, a user can display a selected video clip from the library in region 232 using a viewer which is similar to, but smaller than, the viewer 172 which is reserved for playing back the currently edited video program from the timeline.

Figure 14:
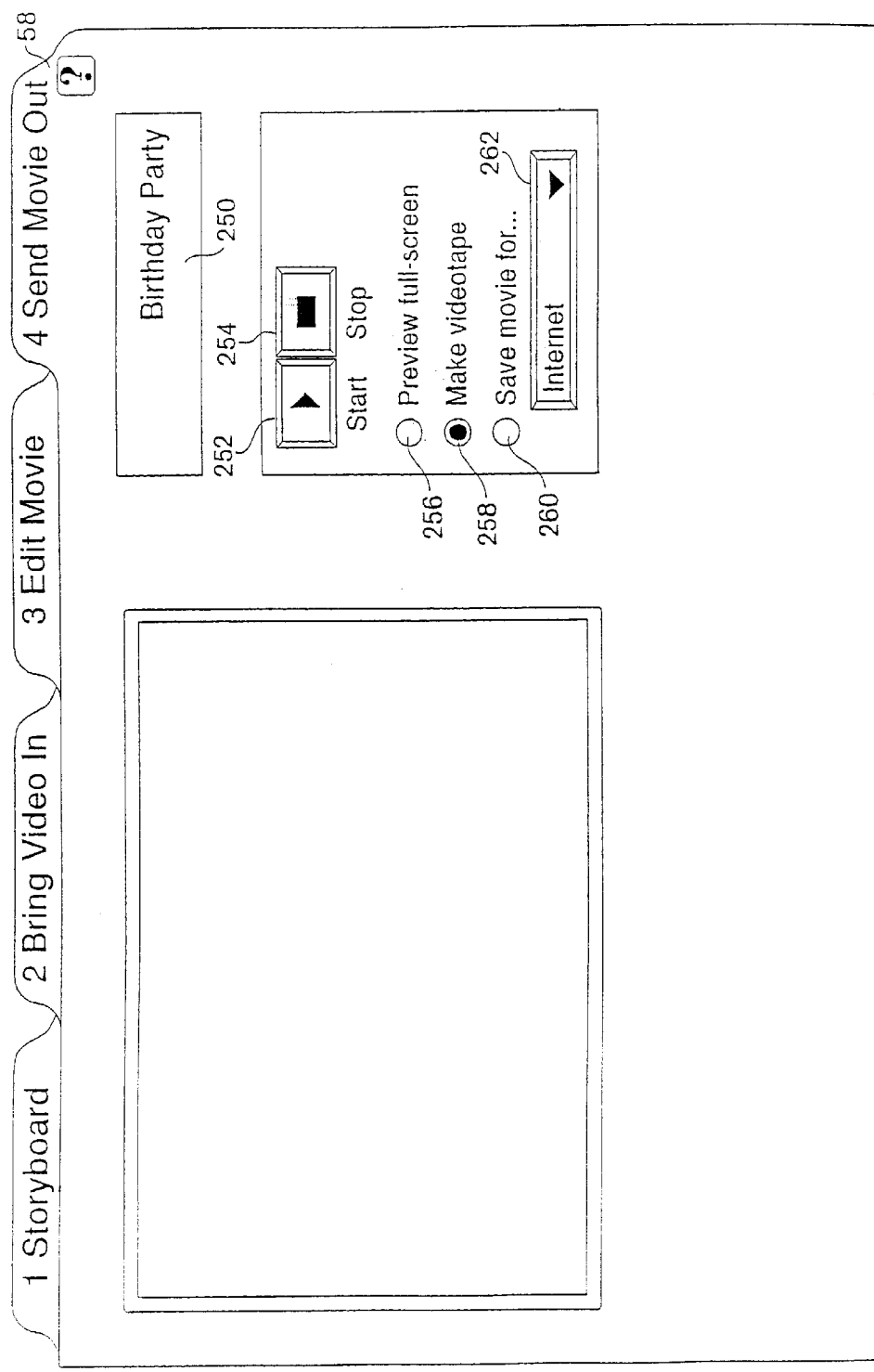
FIG. 14 is a graphic of a graphical user interface for providing recording functions in accordance with one embodiment of the present invention.

When a user has completed editing a movie, the movie can be saved in a final form as one contiguous video program, using the interface 58 shown in FIG. 14. The title of the video program is shown in region 250. Start button 252 and stop button 254 are provided to control, of course, starting and stopping of the playback of the video respectively. Selections are provided to the user for either previewing the video program on the computer screen, as indicated at 256, for making a videotape by outputting the video information through an encoder to a VCR, for example in VHS format. as indicated at 258, or the video information can be saved as a data file in one of several formats, such as QuickTime video, Microsoft video, MPEG video, or Motion-JPEG video as indicated at 260. Such files could be used for presentations, Internet publishing or CD-ROM publication. The selection of the format of the final program is selected, for example, by using the drop down menu 262. Given the inputs provided through this interface, the titles are rendered. The computer then instructs the user, if appropriate, to ensure that the destination of the data, such as a camcorder, is ready. The steps of generating and playing back the video data from the data files into one contiguous stream of video data may be implemented using known techniques.

By providing a simplified interface as described above for accessing several commands for video editing, playback and recording, a user is easily guided through the process of producing a video program.

At any time during the editing process, a user may want to stop and save the current version of the video program or storyboard. Additionally, the user may want to continue editing a composition that is not yet finished. This capability is provided through menu functions which are separate from the selectable interfaces that provide the planning, capturing, editing and recording functions. Menu functions may also be provided for each interface to represent keystrokes used to execute a given command and to set default values for audio and video, input and output, and file and signal formats.

A composition can be stored in one or both of two formats. The first format stores the composition only as a storyboard. Storing a composition as a storyboard involves creating a data file and storing in the data file all of the information about a storyboard, without information about the associated clips. The second format stores all of the information about the current video program as well as the state of the. editing prograrn, i.e., what interface is being used during the save operation. This file format includes an indication of the interface being used, followed by the representations of each track, and the clip descriptions in each track, along with the storyboard shot descriptions including the indications of associated clips. Given a stored composition, when the document is opened again for further editing, the same interface which was last used is presented to the user.

Having now described a few embodiments of the invention, it should be apparent to those skilled in the art that the foregoing is merely illustrative and not limiting, having been presented by way of example only. Numerous modifications and other embodiments are within the scope of one of ordinary skill in the art and are contemplated as falling within the scope of the invention as defined by the appended claims and equivalent thereto.

What is claimed is:

1. A computer-implemented process for computer-assisted planning and editing of a motion picture, comprising:
   A. prior to production of at least one source of motion video information to be used in the motion picture:
      a. storing in a computer system a representation of a plan for the motion picture, wherein the plan specifies a sequence of shots, wherein each shot is specified by a shot description including a reference to a textual description of the shot and a duration of the shot, wherein at least one shot lacks a reference to a source of motion video information for the shot;
      b. displaying to a user a storyboard on a display for the computer system according to the sequence of shots specified by the plan; and
      c. allowing the user to modify the representation of the plan in the computer system;
   B. automatically generating in the computer system a sequence of clips representing the motion picture from the stored representation of the plan, wherein each clip corresponds to a shot in the sequence of shots and has a duration that corresponds at least initially to the duration of the corresponding shot;
   C. after production of at least one source of motion video information to be used in the motion picture:
      a. storing motion video information from the sources in data files on the computer system;
      b. associating motion video information stored in the data files on the computer system with each clip in the representation of the motion picture and storing for each clip a reference to the associated data file and a range within the data file, such that the duration of each clip corresponds to the associated motion video information;
      c. displaying to the user the sequence of clips as a timeline and in a video window on a display for the computer system according using the associated motion video information; and
      d. allowing the user to modify the sequence of clips in the computer system.

2. The computer-implemented process of claim 1, wherein associating motion video information with each clip comprises allowing the user to specify motion video information to be associated with a selected clip.

3. The computer implemented process of claim 2, further comprising displaying to the user an indication of each clip to which motion video information has not been associated.

4. The computer implemented process of claim 2, wherein allowing the user to specify motion video information comprises:
   allowing a user to select the selected clip;
   receiving an instruction from the user to capture motion video information into a data file on the computer while the selected clip is selected; and
   associating the data file with the selected clip.

5. The computer implemented process of claim 4, further comprising displaying to the user an indication of each clip to which motion video information has not been associated.

6. The computer implemented process of claim 1, wherein the shot description further includes a reference to a still image.

7. The computer implemented process of claim 6, wherein the shot description further is assigned a number.

8. The computer implemented process of claim 7, wherein the shot description further includes a tip for filming a shot during production of a source of motion video information.

9. The computer implemented process of claim 6, wherein the shot description further includes a tip for filming a shot during production of a source of motion video information.

10. A process for computer-assisted planning and editing of a motion picture, comprising:
   generating in a computer system a representation of a plan for the motion picture, wherein the plan specifies a sequence of shots, wherein each shot is specified by a shot description including a reference to a textual description of the shot and a duration of the shot, and wherein at least one shot lacks a reference to a source of motion video information for the shot;
   viewing on a display for the computer system a storyboard according to the sequence of shots;
   modifying the representation of the plan in the computer system;
   producing sources of motion video information corresponding to the shot descriptions;
   instructing a computer system to automatically generate a sequence of clips representing the motion picture from the stored representation of the plan, wherein each clip corresponds to a shot in the sequence of shots and has a duration that corresponds at least initially to the duration of the corresponding shot;
   storing motion video information from the sources in data files on the computer system;

associating motion video information stored in the data files on the computer system with each clip in the representation of the motion picture and storing for each clip a reference to the associated data file and a range within the data file, such that the duration of each clip corresponds to the associated motion video information;

viewing on a display for the computer system the sequence of clips as a timeline and in a video window according to the associated motion video information; and modifying the sequence of clips in the computer system.

11. The process of claim 10, wherein associating motion video information with each clip comprises specifying motion video information to be associated with a selected clip.

12. The process of claim 11, further comprising viewing on a displaying an indication of each clip to which motion video information has not been associated.

13. The process of claim 11, wherein specifying motion video information comprises:

selecting the selected clip; and providing an instruction to capture motion video information into a data file on the computer while the selected clip is selected, wherein the computer automatically associates the data file with the selected clip.

14. The process of claim 13, further comprising viewing on a display an indication of each clip to which motion video information has not been associated.

15. The process of claim 10, wherein the shot description further includes a reference to a still image.

16. The process of claim 15, wherein the shot description further is assigned a number.

17. The process of claim 16, wherein the shot description further includes a tip for filming a shot during production of a source of motion video information.

18. The process of claim 15, wherein the shot description further includes a tip for filming a shot during production of a source of motion video information.

19. A computer system for computer-assisted planning and editing of a motion picture, comprising:

A. a planning tool for use prior to production of at least one source of motion video information to be used in the motion picture, and comprising:
   a. means for storing in a computer system a representation of a plan for the motion picture, wherein the plan specifies a sequence of shots, wherein each shot is specified by a shot description including a reference to a textual description of the shot and a duration of the shot, wherein at least one shot lacks a reference to a source of motion video information for the shot;
   b. means for displaying to a user a storyboard on a display for the computer system according to the sequence of shots specified by the plan; and
   c. means for allowing the user to modify the representation of the plan in the computer system; and B. an editing tool for use after production of at least one source of motion video information to be used in the motion picture, and comprising:
   a. means for automatically generating in the computer system a sequence of clips representing the motion picture from the stored representation of the plan, wherein each clip corresponds to a shot in the sequence of shots and has a duration that corresponds at least initially to the duration of the corresponding shot;
   b. means for storing motion video information from the sources in data files on the computer system;
   c. means for associating motion video information stored in the data files on the computer system with each clip in the representation of the motion picture and storing for each clip a reference to the associated data file and a range within the data file, such that the duration of each clip corresponds to the associated motion video information;
   d. means for displaying to the user the sequence of clips as a timeline and in a video window on a display for the computer system according using the associated motion video information; and
   e. means for allowing the user to modify the sequence of clips in the computer system.

20. The computer system of claim 19, wherein the means for associating motion video information with each clip comprises means for allowing the user to specify motion video information to be associated with a selected clip.

21. The computer system of claim 20, further comprising means for displaying to the user an indication of each clip to which motion video information has not been associated.

22. The computer system of claim 20, wherein the means for allowing the user to specify motion video information comprises:

means for allowing a user to select the selected clip;

means for receiving an instruction from the user to capture motion video information into a data file on the computer while the selected clip is selected; and means for associating the data file with the selected clip.

23. The computer system of claim 22, further comprising means for displaying to the user an indication of each clip to which motion video information has not been associated.

24. The computer system of claim 19, wherein the shot description further includes a reference to a still image.

25. The computer system of claim 24, wherein the shot description further is assigned a number.

26. The computer system of claim 25, wherein the shot description further includes a tip for filming a shot during production of a source of motion video information.

27. The computer system of claim 24, wherein the shot description further includes a tip for filming a shot during production of a source of motion video information.

* * * * *